(12) United States Patent
Rhee et al.

(10) Patent No.: US 11,061,698 B2
(45) Date of Patent: Jul. 13, 2021

(54) ELECTRONIC APPARATUS AND OPERATING METHOD THEREOF

(71) Applicant: Samsung Electronics Co., Ltd., Suwon-si (KR)

(72) Inventors: Injong Rhee, Seongnam-si (KR); Kwang-Seok Kim, Suwon-si (KR); Joonwon Park, Yongin-si (KR); Yongseok Park, Yongin-si (KR); Hyo-Jin Jung, Yongin-si (KR); Sungju Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 15/697,912

(22) Filed: Sep. 7, 2017

(65) Prior Publication Data
US 2018/0067755 A1 Mar. 8, 2018

(30) Foreign Application Priority Data
Sep. 7, 2016 (KR) .................. 10-2016-0115291

(51) Int. Cl.
*G06F 9/451* (2018.01)
*G06F 21/62* (2013.01)
(Continued)

(52) U.S. Cl.
CPC ............ *G06F 9/451* (2018.02); *G06F 3/0484* (2013.01); *G06F 21/31* (2013.01); *G06F 21/36* (2013.01);
(Continued)

(58) Field of Classification Search
CPC ........ G06F 21/31; G06F 21/36; G06F 3/0484; G06F 21/44; G06F 21/45; G06F 21/629;
(Continued)

(56) References Cited

U.S. PATENT DOCUMENTS 9,324,068 B2 * 4/2016 Soundararajan ...... H04W 4/029
10,019,710 B2 * 7/2018 Soundararajan ....... G06Q 20/20
(Continued)

FOREIGN PATENT DOCUMENTS

| EP | 2693724 A2 | 2/2014 |
|---|---|---|
| KR | 10-2016-0030640 A | 3/2016 |
| WO | 2016059564 A1 | 4/2016 |

OTHER PUBLICATIONS

Extended European Search Report dated Nov. 14, 2017, issued in the European Application No. 17189830.7-1870.
(Continued)

*Primary Examiner* — Andrea N Long
(74) *Attorney, Agent, or Firm* — Jefferson IP Law, LLP

(57) ABSTRACT

An electronic device and an operating method are provided. The electronic device includes a display and a processor. The processor may be configured to display a first-mode launch screen for an application on the display based on an application launching request in a state where a lock function is set, switch the first-mode launch screen displayed on the display to a second-mode launch screen of the application based on a mode switching request, and determine whether to proceed with an authentication operation based on an operation selected from the second-mode launch screen.

20 Claims, 18 Drawing Sheets

(51) Int. Cl.
*G06F 21/31* (2013.01)
*G06F 3/0484* (2013.01)
*G06F 21/36* (2013.01)

(52) U.S. Cl.
CPC .... *G06F 21/629* (2013.01); *G06F 2221/2113* (2013.01)

(58) Field of Classification Search
CPC ........... G06F 2221/2113; G06F 9/4443; G06F 9/451; B60R 1/00; B60R 2300/303; B60R 2300/60; B60R 2300/802; G06K 9/00805; G06K 9/4604; G06K 9/4647; G06K 9/4671; G06K 9/6215; G06K 9/6269; G06T 2207/10004; G06T 2207/20021; G06T 2207/30261; G06T 7/13; G06T 7/248; G08G 1/166; G08G 1/167; H04N 5/23229; H04N 5/23293; H04N 5/247; H04N 5/77; H04N 7/181; H04W 4/40; H04W 4/80
See application file for complete search history.

(56) References Cited

U.S. PATENT DOCUMENTS

| | | | |
|---|---|---|---|
| 10,057,400 B1* | 8/2018 | Gordon | H04M 1/67 |
| 2010/0146384 A1 | 6/2010 | Peev et al. | |
| 2012/0009896 A1 | 1/2012 | Bandyopadhyay et al. | |
| 2012/0023573 A1 | 1/2012 | Shi | |
| 2012/0284297 A1* | 11/2012 | Aguera-Arcas | G06F 3/03547 707/769 |
| 2013/0187753 A1* | 7/2013 | Chiriyankandath | G06F 3/0488 340/5.51 |
| 2013/0298226 A1 | 11/2013 | Fang et al. | |
| 2014/0040756 A1* | 2/2014 | Bukurak | G06F 3/017 715/741 |
| 2014/0214640 A1* | 7/2014 | Mallikarjunan | G06Q 20/322 705/35 |
| 2014/0256295 A1* | 9/2014 | Peng | G06F 3/0488 455/412.2 |
| 2015/0163221 A1 | 6/2015 | Bolin et al. | |
| 2015/0254636 A1* | 9/2015 | Yoon | G06Q 20/3278 705/44 |
| 2016/0077606 A1 | 3/2016 | Hyun et al. | |
| 2016/0098878 A1 | 4/2016 | Cabouli et al. | |
| 2016/0224780 A1 | 8/2016 | Kukreja et al. | |
| 2016/0224973 A1* | 8/2016 | Van Os | G06Q 20/3276 |
| 2016/0239821 A1* | 8/2016 | Park | G06F 21/32 |
| 2017/0124548 A1* | 5/2017 | Bolla | G06Q 20/32 |
| 2018/0048752 A1* | 2/2018 | Zhou | H04M 1/67 |

OTHER PUBLICATIONS

International Search Report dated Dec. 20, 2017, issued in the International Application No. PCT/KR2017/009817 filed Sep. 7, 2017.
European Office Action dated Nov. 4, 2019, issued in European Application No. 17 189 830.7-1218.
European Search Report dated Mar. 26, 2021; European Application No. 17 189 830.7-1218.

* cited by examiner

ELECTRONIC APPARATUS AND OPERATING METHOD THEREOF

CROSS-REFERENCE TO RELATED APPLICATION(S)

This application claims the benefit under 35 U.S.C. § 119(a) of a Korean patent application filed on Sep. 7, 2016 in the Korean Intellectual Property Office and assigned Serial number 10-2016-0115291, the entire disclosure of which is hereby incorporated by reference.

TECHNICAL FIELD

The present disclosure relates to an apparatus and method for launching an application in a state where a lock function is set in an electronic device.

BACKGROUND

With the advance of information communication techniques and semiconductor techniques, various electronic devices are being developed into multimedia devices for providing various multimedia services. For example, the electronic device may provide various multimedia services such as a broadcasting service, a wireless Internet service, a camera service, and a music playback service.

Since the electronic devices are more frequently used by users, various user interfaces are provided to the user. For example, the electronic device provides a lock screen capable of inputting user authentication information (e.g., fingerprint information, pattern information, password information, iris information, etc.).

In addition, the electronic device may output a launch screen of an application in a state where the lock function is set. For example, the electronic device may output a launch screen (e.g., a quick-launch screen) for providing some functions of the application even in a state where the lock function is not released.

The above information is presented as background information only to assist with an understanding of the present disclosure. No determination has been made, and no assertion is made, as to whether any of the above might be applicable as prior art with regard to the present disclosure.

The electronic device may switch a quick-launch screen output in a state where the lock function is set to a screen (e.g., an application home screen) for providing all functions of the application. However, since the application home screen is set to be output in a state where the lock function is released, the electronic device needs to perform an additional operation of releasing the lock function before switching the screen.

Aspects of the present disclosure are to address at least the above-mentioned problems and/or disadvantages and to provide at least the advantages described below. Accordingly, an aspect of the present disclosure is to provide an apparatus and method according to various embodiments of the present disclosure may switch a quick-launch screen to an application home screen in a state where a lock function is not released.

Another aspect of the present disclosure is to provide an apparatus and method may perform an authentication operation of releasing a lock function when a menu requiring authentication is selected in a state where an application home screen is output.

In accordance with an aspect of the present disclosure, an electronic device is provided. The electronic device includes a display and a processor. The processor may be configured for displaying a first-mode launch screen for an application on the display based on an application launching request in a state where a lock function is set, switching the first-mode launch screen displayed on the display to a second-mode launch screen of the application based on a mode switching request, and determining whether to proceed with an authentication operation based on an operation selected from the second-mode launch screen.

In accordance with another aspect of the present disclosure, an electronic device is provided. The electronic device includes a display and a processor. The processor may be configured for displaying a first-mode launch screen of an activation state and a second-mode launch screen of a deactivation state for the application on the display based on an application launching request in a state where a lock function is set, stopping the displaying of the first-mode launch screen displayed on the display based on a request for activating the second-mode launch screen, switching the second-mode launch screen to the activation state, and determining whether to proceed with an authentication operation based on an operation selected from the second-mode launch screen switched to the activation state.

In accordance with another aspect of the present disclosure, a method of operating an electronic device is provided. The method includes displaying a first-mode launch screen for an application based on an application launching request in a state where a lock function is set, switching the displayed first-mode launch screen to a second-mode launch screen of the application based on a mode switching request, and determining whether to proceed with an authentication operation on the basis of an operation selected from the second-mode launch screen.

In accordance with another aspect of the present disclosure, a computer readable recording medium is provided. The computer readable recording medium may store a program for executing an operation of displaying a first-mode launch screen for an application based on an application launching request in a state where a lock function is set, switching the displayed first-mode launch screen to a second-mode launch screen of the application based on a mode switching request, and determining whether to proceed with an authentication operation based on an operation selected from the second-mode launch screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
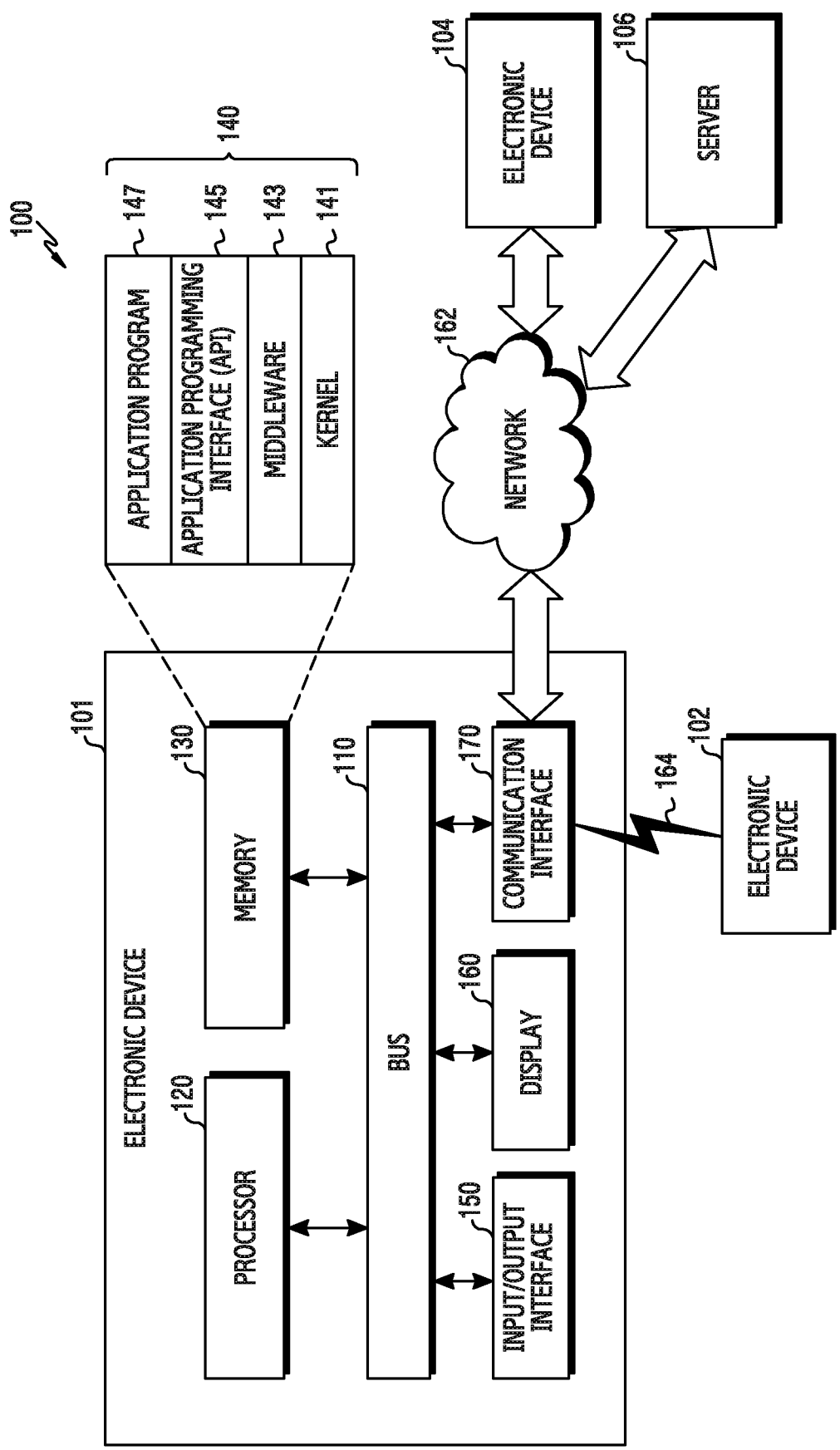
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, the terms used herein are defined in consideration of functions of the present disclosure and may vary depending on a user's or an operator's intension and usage. Therefore, the terms used herein should be understood based on the descriptions made herein. In the present disclosure, an expression such as "A or B," "at least one of A or/and B," or "one or more of A or/and B" may include all possible combinations of together listed items. Expressions such as "first," "second," "primarily," or "secondary," used in various embodiments may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through the other element such as a third element).

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a central processing unit (CPU) or an application processor) that can perform a corresponding operation by executing at least one software program stored at an exclusive processor s as an embedded processor) for performing a corresponding operation or at a memory device.

An electronic device according to various embodiments of the present disclosure can include, for example, at least one of a smart phone, a tablet personal computer (PC), a mobile phone, a video phone, an c-book reader, a desktop PC, a laptop PC, a netbook computer, a workstation, a sever, a personal digital assistant (PDA), a portable multimedia player (PMP), an Moving Picture Experts Group Layer-3 (MPEG-1 or MPEG-2) audio layer 3 (MP3) player, a mobile medical equipment, a camera, and a wearable device. The wearable device can include at least one of an accessory type (e.g., a watch, a ring, a bracelet, an ankle bracelet, a necklace, glasses, a contact lens, or a head-mounted-device (HMD), a fabric or clothing embedded type (e.g., electronic garments), a body attachable type (e.g., a skin pad or a tattoo), and an implantable circuit. The electronic device can include at least one of, for example, a television (TV), a digital versatile disc (DVI)) player, an audio device, a refrigerator, an air-conditioner, a cleaner, an oven, a microwave oven, a washing machine, an air cleaner, a set-top box, a home automation control panel, a security control panel, a media box (such as Samsung HomeSync™, Apple TV™, or Google TV™), a game console (such as Xbox™, PlayStation™) an electronic dictionary, an electronic key, a camcorder, and an electronic frame.

In another embodiment of the present disclosure, the electronic device can include at least one of various medical devices (such as various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, an electronic equipment for ship (such as a navigation device for ship and gyro compass), avionics, a security device, a head unit for a vehicle, an industrial or home robot, a drone, an automatic teller's machine (ATM) of a financial institution, a point of sales (POS) of a store, and Internet of things (IoT) (such as a bulb, various sensors, a sprinkler device, a fire alarm, a thermostat, a street light, a toaster, a sports equipment, a hot water tank, a heater, and a boiler). According to an embodiment of the present disclosure, the electronic device can include at least one of a portion of furniture, building/construction or vehicle, an electronic board, an electronic signature receiving device, a projector, and various measuring devices (such as water supply, electricity, gas, or electric wave measuring device). An electronic device according to an embodiment is a flexible electronic device or a combination of two or more of the foregoing various devices. An electronic device according to an embodiment of the present disclosure is not limited to the foregoing devices and includes a new electronic device according to technical development. In this specification, the term "user" can refer to a person using an electronic device or a device using an electronic device (e.g., an artificial intelligent electronic device).

FIG. 1 illustrates an electronic device in a network environment according to various embodiments of the present disclosure.

Referring to FIG. 1, an electronic device 101 resides in a network 100. The electronic device 101 can include a bus 110, a processor 120, a memory 130, an input/output (I/O) interface 150, a display 160, and a communication interface 170. The electronic device 101 can omit at least one of the components or further include another component. The bus 110 can include a circuit for connecting the components 110 to 170 and delivering communication signals (e.g., control messages or data) therebetween. The processor 120 can include one or more of a central processing unit, an application processor, and a communication processor (CP). The processor 120, for example, can perform an operation or data processing on control and/or communication of at least another component of the electronic device 101.

According to an embodiment of the present disclosure, the processor 120 may launch a designated application or an application corresponding to an input in a state where a lock function is set. For example, the processor 120 may output a first-mode launch screen (e.g., a quick-launch screen) capable of providing some functions of the application to a screen (e.g., a lock screen) for which the lock function is set. For example, the processor 120 may stack the first-mode launch screen of a layered form onto the screen for which the lock function is set.

According to embodiment of the present disclosure, upon detecting an input for instructing switching of a launch mode, the processor 120 may switch the first-mode launch screen to a second-mode launch screen in the state where the lock function is set. For example, in response to detection of the input for instructing the switching of the launch mode, the processor 120 may output the second-mode launch screen capable of providing relatively a greater number of functions than the first-mode launch screen. For example, the second-mode launch screen may be an application home screen (e.g., a main screen).

According to embodiment of the present disclosure, upon detecting an input for selecting a menu included in the second-mode launch screen, the processor 120 may output a screen corresponding to the selected menu. Alternatively, the processor 120 may determine whether to perform an authentication operation before outputting the screen corresponding to the selected menu. For example, if the selected menu corresponds to the menu designated to perform the authentication operation, the processor 120 may output the screen corresponding to the selected menu after the user authentication. For example, the menu designated to perform the authentication operation may be a menu (e.g., a personal information change menu, a payment menu, etc.) for invoking a screen (e.g., a payment screen, a personal information input screen, etc.) to which only an authenticated user can have access. For another example, if the selected menu does not correspond to the menu designated to perform the authentication operation, the processor 120 may output the screen corresponding to the selected menu by skipping the user authentication.

The memory 130 can include a volatile and/or nonvolatile memory. The memory 130, for example, can store commands or data relating to at least another component of the electronic device 101. According to one embodiment, the memory 130 may store information required for the authentication operation. For example, the information required for the authentication operation may be authentication information for releasing the lock function. For example, the memory 130 may store at least one of a fingerprint, password, pattern, and iris information for the user authentication. For another example, the information required for the authentication operation may be information used to determine whether to perform the authentication operation. For example, the memory 130 may store information regarding functions (or menus) of an application which requires the authentication operation.

According to an embodiment of the present disclosure, the memory 130 can store software and/or a program 140. The program 140, for example, can include a kernel 141, middleware 143, an application programming interface (API) 145, and/or an application program (or "application") 147. At least part of the kernel 141, the middleware 143, or the API 145 can be called an operating system (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve as an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application program 147 controls a function provided from the kernel 141 or the middleware 143, can include, for example, at least one interface or function (e.g., an instruction) for file control, window control, image processing, or character control.

The I/O interface 150 may recognize a user's input. The I/O interface 150 may be a touch input unit. In addition, the I/O interface 150 may be an input/output interface including an output unit. The input/output interface may serve as an interface for delivering a command or data which is inputted from the user or another external device to the other element(s) of the electronic device 101. In addition, the input/output interface may output a command or data which is received from the other element(s) of the electronic device 101 to the user or another external device.

The display 160, for example, can include a liquid crystal display (LCD), a light emitting diode (LED) display, an organic light emitting diode (OLED) display, a microelectromechanical systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. According to one embodiment, the display 160 may output summary information generated by the processor 120. According to various embodiments, the display 160 may output the video data reproduced based on the adjusted time to reproduce video data.

The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over the network 162 through wireless communication or wired communication.

The wireless communication, for example, can at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. The wireless communication may include, for example, short-range communication 164. The short-range communication 164 may be conducted by, for example, at least one of Wi-Fi®, Bluetooth®, Bluetooth low energy (BLE), Zigbee®, near field communication (NFC), magnetic secure transmission (MST), radio frequency (RF), and body area network (BAN). The wireless communication can include GNSS. The GNSS can include, for example, global positioning system (GPS), global navigation satellite system (GLONASS), BeiDou navigation satellite system (BeiDou), or Galileo (the European global satellite-based navigation system). Hereafter, the GPS can be interchangeably used with the GNSS. The wired communication, for example, can include at least one of universal serial bus (USB), high definition multimedia interface (HDMI), recommended standard 232 (RS-232), power line communications, and plain old telephone service (POTS). The network 162 can include at least one of telecommunications networks such as computer network (e.g., local area network (LAN) or wireless area network (WAN)), Internet, and telephone network.

Each of the first and second external electronic devices 102 and 104 can be the same or different type of the electronic device 101. According to various embodiments, all or part of operations executed in the electronic device 101 can be executed by another or a plurality of electronic devices (e.g., the electronic device 102 or 104 or the server 106). When the electronic device 101 is to perform a function or service automatically or at the request, instead of performing the function or the service by the electronic device 101 or additionally, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and deliver its result to the electronic device 101. The electronic device 101 can provide the requested function or service by processing the received result as it is or additionally. For doing so, for example, cloud computing, distributed computing, or client-server computing techniques can be used.

Figure 2:
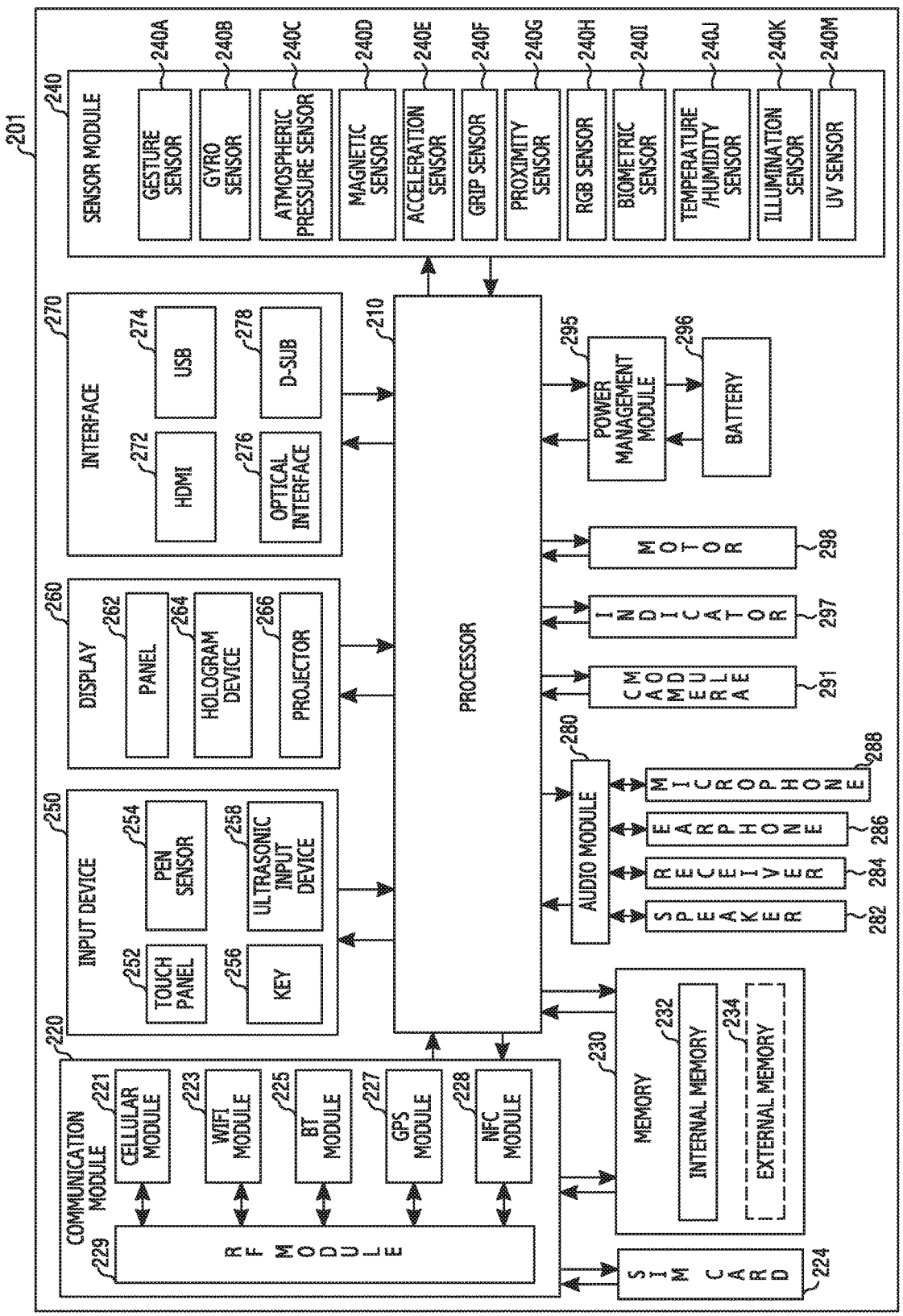
FIG. 2 is a block diagram of an electronic device according to various embodiments of the present disclosure.

FIG. 2 is a block diagram illustrating an electronic device 201 according to various embodiments of the present disclosure. The electronic device 201 may configure, for example, all or a portion of the electronic device 101 illustrated in FIG. 1.

Referring to FIG. 2, the electronic device 201 may include one or more processors (e.g., AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

The processor 210 may drive an OS or an application to control a plurality of hardware or software elements connected to the processor 210, and perform various data processes including multimedia data and operations. The processor 210 may be implemented, for example, as a system on chip (SoC). According to an embodiment of the present disclosure, the processor 210 may further include at least one of a graphic processing unit (GPU) or image signal processor (ISP). According to an embodiment, the processor 210 may be implemented to include at least a portion (e.g., the cellular module 221) of the above-described elements. Also, the processor 210 may stores data received from at least one of other elements or generated by at least one of other elements in a non-volatile memory.

The communication module 220 (e.g., the communication interface 170) may perform data transmission/reception in communication between the electronic device 201 (e.g., the electronic device 101) and other electronic devices (e.g., the electronic device 104 or the server 106) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., ITE, LTE-A, CDMA, WCDMA, UMTS, WiBro, or GSM, etc.). Also, the cellular module 221 may perform discrimination and authentication of an electronic device within a communication network using, for example, a subscriber identify module (e.g., a SIM card 224). According to an embodiment, the cellular module 221 may perform at least a portion of functions that may be provided by the processor 210. According to an embodiment, the cellular module 221 may include a CP. Also, the cellular module 221 may be, for example, implemented as a SoC. Though elements such as the cellular module 221 (e.g., a communication processor), the memory 230, or the power management module 295, etc.

are illustrated as elements separated from the processor 210 in FIG. 2, according to an embodiment, the processor 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the UPS module 227, or the NFC module 228 are illustrated as separate blocks in FIG. 2, according to an embodiment, at least a portion (e.g., two or more elements) of the cellular module 221, the Wi-Fi module 223, the BT module 225, the UPS module 227, or the NFC module 228 may be included in one integrated circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (INA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the UPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RE signal via a separate RF module.

The SIM card 224 may be a card including a subscriber identify module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. The internal memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.

According to an embodiment, the internal memory 232 may be a solid state drive (SSD). The external memory 234 may further include a flash drive, for example, compact flash (CF), secure digital (SD), micro-SD, mini-SD, extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input device 250 may include a touch panel 252, a (digital) pen sensor 254, a key 256, or an ultrasonic input device 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input device 258 is a device for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 160) may include a panel 262, a hologram device 264, or a projector 266. The panel 262 may be, for example, a LCD, or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, a SD card/multi-media card (MMC) interface, or an infrared data association (IrDA) standard interface.

The audio module 280 may convert a sound and an electric signal in dual directions. At least a partial element of the audio module 280 may be included, for example, in the I/O interface 150 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an ISP (not shown), or a flash (not shown) (e.g., an LED or xenon lamp).

The power management module 295 may manage power of the electronic device 201. Though not shown, the power management module 295 may include, for example, a power management integrated circuit (PMIC), a charger IC, or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the processor 210), for example, a booting state, a message state, or a charging state, etc. The motor 298 may convert an electric signal to mechanical vibration. Though not shown, the electronic device 201 may include a processor (e.g., a GPU) for supporting a mobile TV The processor for supporting the mobile TV may process media data corresponding to standards, for example, such as digital multimedia broadcasting (DMB), digital video broadcasting (DVB), or a media flow, etc.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
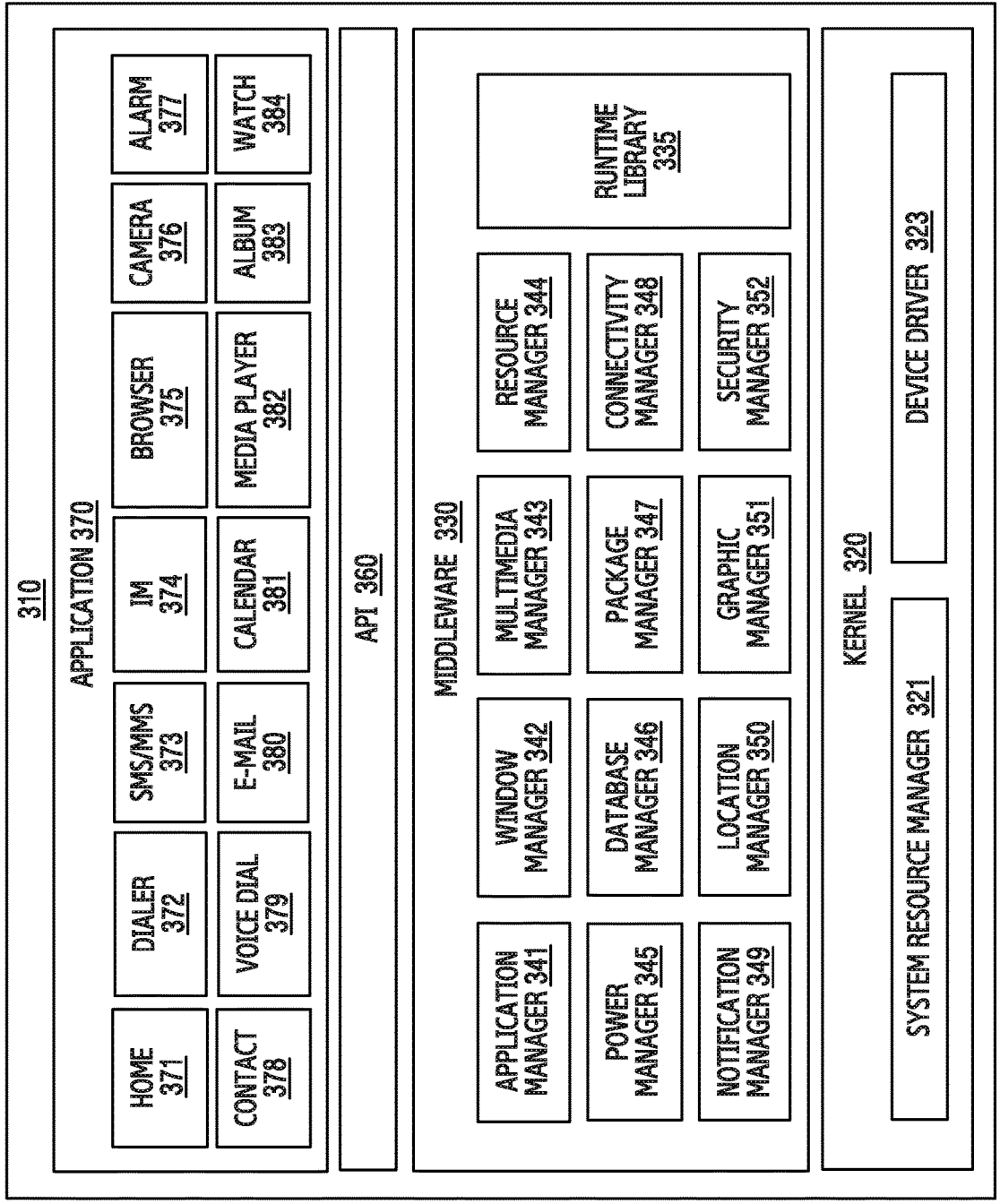
FIG. 3 is a block diagram of a program module according to various embodiments of the present disclosure.

FIG. 3 is a block diagram of a program module 310 according to various embodiments of the present disclosure.

According to an embodiment, the program module 310 (for example, the programs 140) may include an OS for controlling resources related to the electronic device (for example, the electronic device 101) and/or various applications (for example, the application programs 147) executed in the operating system. The OS may be, for example, Android™, iOS™ Windows™, Symbian™, Tizen™, Bada™, or the like.

The program module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 321 or a device driver 323. The system resource manager 321 may control, allocate, or collect the system resources. According to an embodiment, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage graphical user interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a BIOS to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, the electronic device 101)

has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, short message service (SMS)/multimedia messaging service (MMS) 373, instant message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 101) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 101 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/cuff the external electronic device itself (or some elements thereof) or adjusting brightness (or resolution) of a display), applications executed in the external electronic device, or services provided from the external electronic device (for example, a telephone call service or a message service).

According to an embodiment of the present disclosure, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the program module 310 may be implemented by software, firmware, hardware, or a combination of two or more thereof. At least some of the program module 310 may be implemented (for example, executed) by, for example, the processor (for example, the application program). At least some of the program module 310 may include, for example, a module, program, routine, sets of instructions, or process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, an electronic device (e.g., the electronic device 101) may include a display (e.g., the display 160) and a processor (e.g., the processor 120). According to one embodiment, the processor may be configured for displaying a first-mode launch screen for an application on the display based on an application launching request in a state where a lock function is set, switching the first-mode launch screen displayed on the display to a second-mode launch screen of the application based on a mode switching request, and determining whether to proceed with an authentication operation based on an operation selected from the second-mode launch screen.

According to various embodiments of the present disclosure, an electronic device may include a display and a processor. The processor may be configured for displaying a first-mode launch screen of an activation state and a second-mode launch screen of a deactivation state for the application on the display based on an application launching request in a state where a lock function is set, stopping the displaying of the first-mode launch screen displayed on the display based on a request for activating the second-mode launch screen, switching the second-mode launch screen to the activation state, and determining whether to proceed with an authentication operation based on an operation selected from the second-mode launch screen switched to the activation state.

According to one embodiment of the present disclosure, the selected operation may include an operation of invoking a user interface (or a GUI) for accessing personal information.

According to one embodiment, the processor may be configured for skipping the authentication operation for an operation selected in the second mode in response to completion of authentication before switching to the second-mode launch screen.

According to one embodiment of the present disclosure, the first-mode launch screen may include a screen for controlling designated some functions of the application.

According to one embodiment, the second-mode launch screen may include a main screen of the application.

According to one embodiment, the processor may be configured for outputting a screen corresponding to a menu requiring authentication if the authentication is successful through the authentication operation.

According to one embodiment, the processor may be configured for releasing the lock function if the authentication is successful through the authentication operation.

Figure 4:
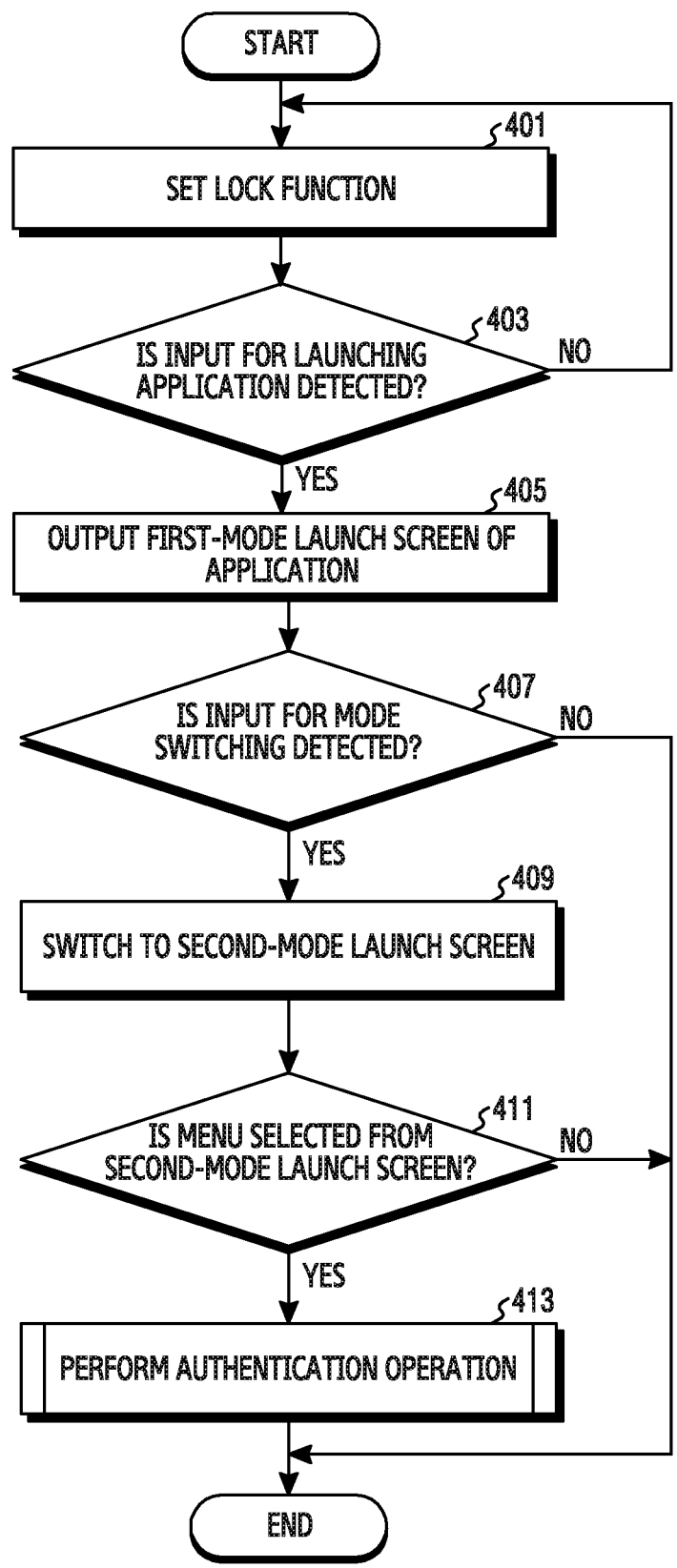
FIG. 4 is a flowchart illustrating an operation of launching an application in a state where a lock function is set in the electronic device 101 according to various embodiments of the present disclosure.

FIG. 4 is a flowchart illustrating an operation of launching an application in a state where a lock function is set in the electronic device 101 according to various embodiments of the present disclosure.

Figure 5:
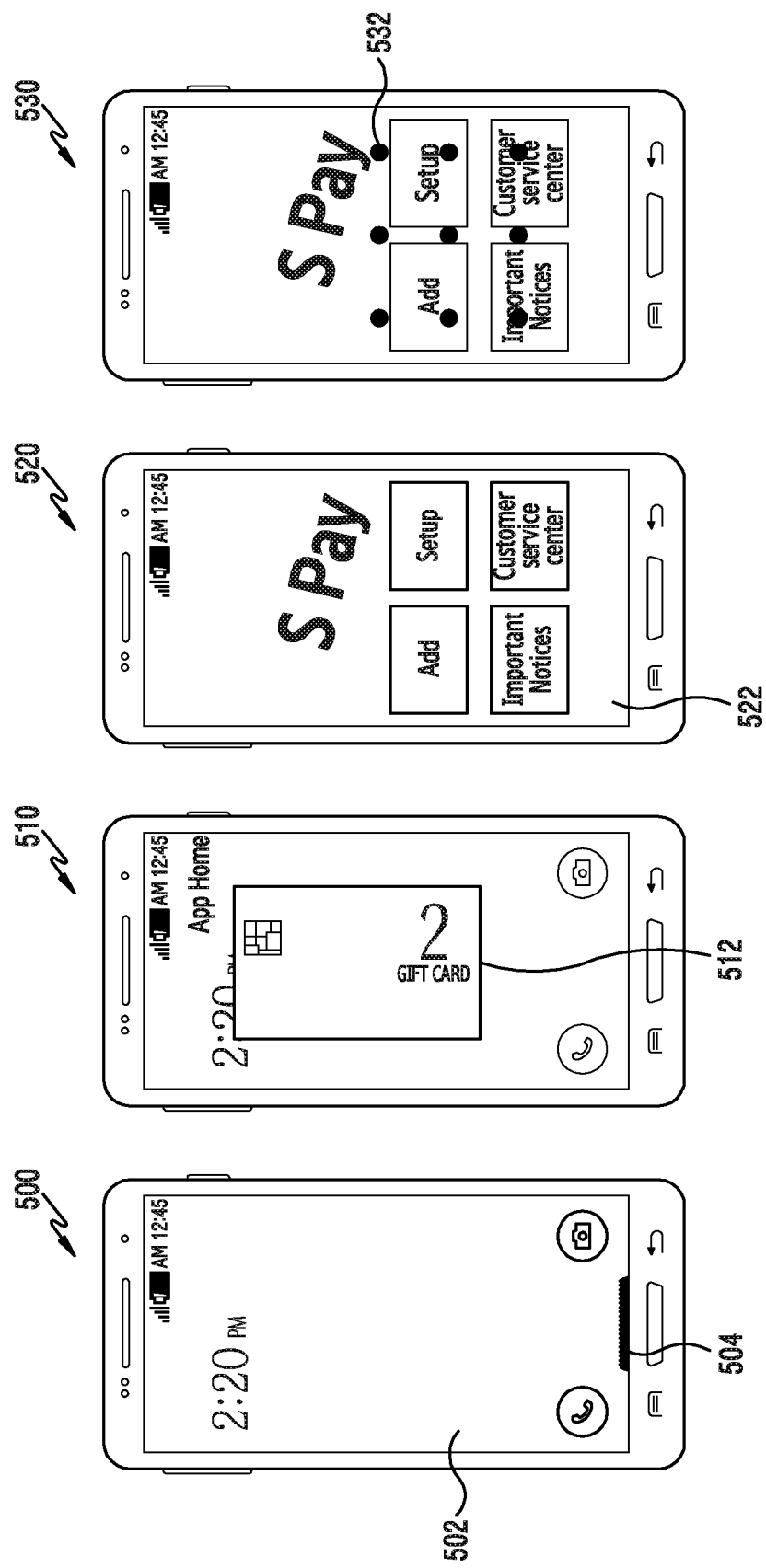
FIG. 5 is a diagram for explaining an operation of launching an application according to various embodiments of the present disclosure.

FIG. 5 is a diagram for explaining an operation of launching an application according to various embodiments of the present disclosure. According to one embodiment, the electronic device 101 may be the processor 120 of the electronic device 101.

Referring to FIG. 4, in operation 401, the electronic device 101 may set the lock function. For example, the electronic device 101 may set the lock function having a specific level of security. For example, the lock function having the specific level of security may be a lock function which requires user authentication information (e.g., fingerprint information, pattern information, password information, iris information, etc.) to release the lock function.

In operation 403, the electronic device 101 may determine whether an input for application launching is detected. For example, as shown in 500 of FIG. 5, the electronic device 101 may determine whether a user input is detected which sweeps in a direction of a display from a bottom area of a screen (e.g., a lock screen) 502 for which the lock function is set. For another example, the electronic device 101 may display an indicator 504 to indicate that the application can be launched on the screen 502 for which the lock function is set, and may determine whether a user input for the indicator is detected.

Upon detecting no input for application launching, the electronic device 101 may determine whether to launch the application in the state where the lock function is set. For example, the electronic device 101 may perform an operation associated with operation 401. For another example, the electronic device 101 may perform an operation associated with operation 403.

Upon detecting the input for application launching, in operation 405, the electronic device 101 may output a first-mode launch screen for the application in the state where the lock function is set. The first-mode launch screen may be a launch screen (e.g., a quick-launch screen) capable of providing some functions of the application. For example, as shown in 510 of FIG. 5, the electronic device 101 may output a first-mode launch screen 512 in the state where the lock function is set. For example, the electronic device 101 may output the first-mode launch screen by using a control command intent) having an attribute (e.g., FLAG_SHOW_WHEN_LOCK) for displaying predetermined information (e.g., an application launch screen) on a screen for which the lock function is set.

In operation 407, the electronic device 101 may determine whether an input for mode switching is detected. For example, the mode switching may include switching from the first-mode launch screen to the second-mode launch screen for the application. For example, the second-mode launch screen may be a launch screen (e.g., an application home screen (e.g., main screen)) capable of providing relatively a greater number of functions (e.g., all functions) than the first-mode launch screen. The electronic device 101 may determine an input for selecting the first-mode launch screen output as shown in 510 of FIG. 5 or an area (e.g., an App home menu (or icon)) designated in the first-mode launch screen as the input for mode switching.

Upon detecting no input for mode switching, the electronic device 101 may control the operation of the electronic device 101 based on the first-mode launch screen. For example, if the first-mode launch screen is output for a payment application, the electronic device 101 may perform a payment operation in a state where the first-mode launch screen is output. For example, the electronic device 101 may output payment information to a payment terminal based on a designated method (e.g., an MST method, etc.).

Upon detecting the input for mode switching, in operation 409, the electronic device 101 may switch the first-mode launch screen to the second-mode launch screen. For example, as shown in 520 of FIG. 5, the electronic device 101 may switch the output first-mode launch screen to a second-mode launch screen 522 for the application. The electronic device 101 may prevent predetermined information (e.g., an unlock screen) from being output when switching the launch screen. For example, the electronic device 101 may switch the first-mode launch screen to the second-mode launch screen by using a control command (e.g., pending intent) for limiting an output of the predetermined information (e.g., the unlocked screen) until a designated time point (e.g., a time at which a menu requiring authentication is selected).

In operation 411, the electronic device 101 may determine whether an input for selecting a menu from the second-mode launch screen is detected. For example, the electronic device 101 may determine whether an input for selecting at least one menu is detected from a menu (e.g., an add menu, a setup menu, an important notices menu, and a customer service center menu) included in the second-mode launch screen output as shown in 520 of FIG. 5.

Upon detecting no input for selecting the menu, the electronic device 101 may maintain the output of the second-mode launch screen.

Upon detecting the input for selecting the menu, in operation 413, the electronic device 101 may perform the authentication operation. For example, the electronic device 101 may perform the authentication operation of releasing the lock based on the selection of the menu requiring authentication. The electronic device 101 may perform the authentication operation by outputting a screen for receiving authentication information. For example, as shown in 530 of FIG. 5, the electronic device 101 may output a screen (e.g., an unlock screen) 532 for receiving authentication information corresponding to an unlock mechanism which is set in a state where the second-mode launch screen is output. For example, the electronic device 101 may allow a screen for receiving the authentication information to be output on the second-mode launch screen. For another example, the electronic device 101 may operate a sensor for acquiring the authentication information.

Figure 6:
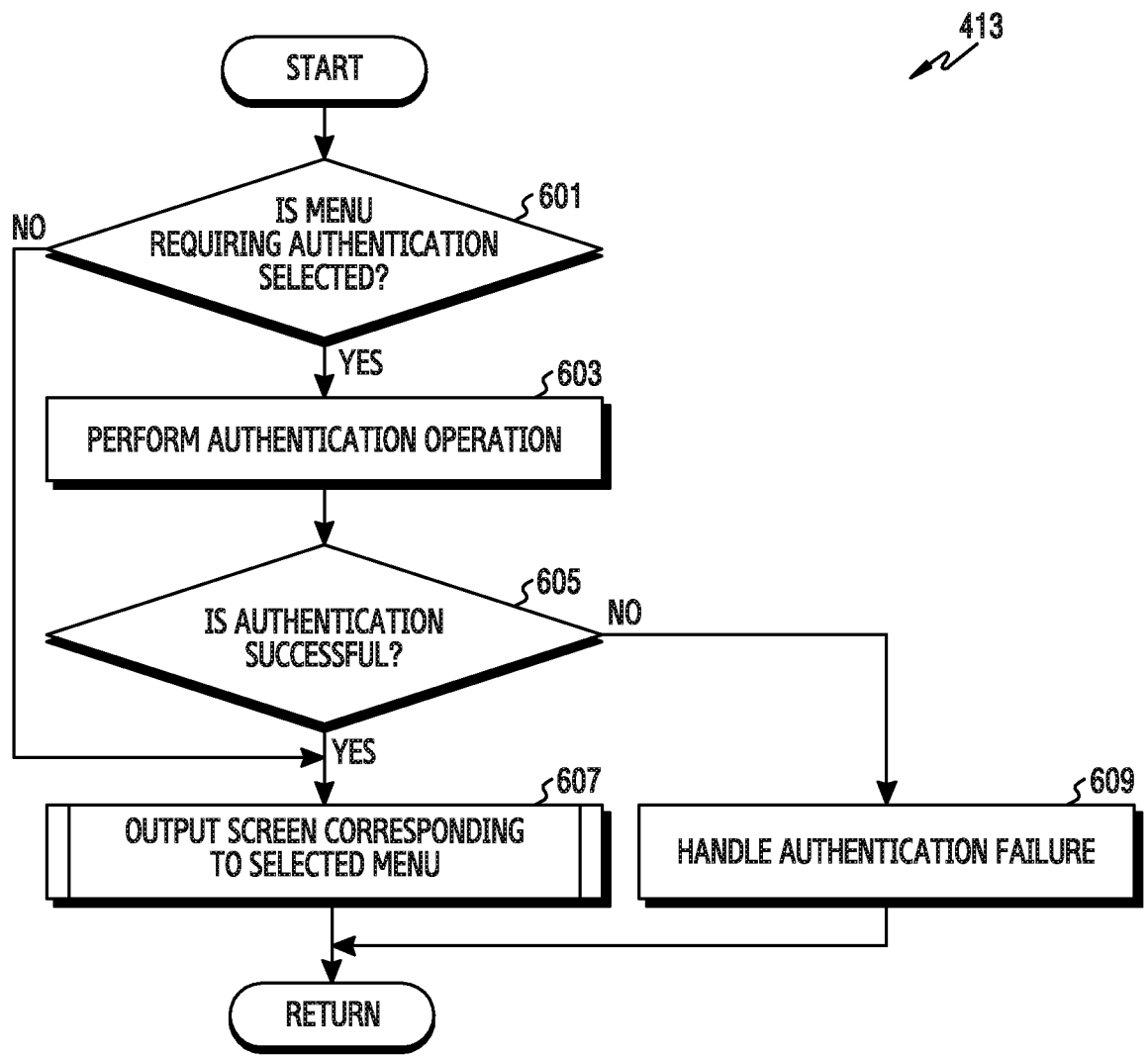
FIG. 6 is a flowchart illustrating a procedure of performing an authentication operation in the electronic device 101 according to various embodiments of the present disclosure.

FIG. 6 is a flowchart illustrating a procedure of performing an authentication operation in the electronic device 101 according to various embodiments of the present disclosure.

Figure 7A:
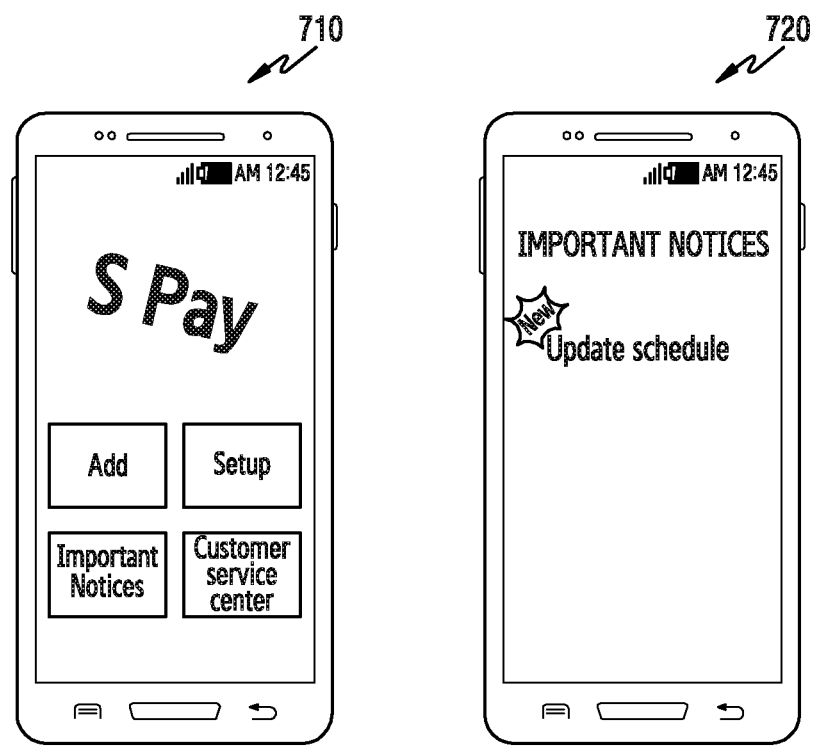
FIGS. 7A and 7B are diagrams for explaining an authentication operation according to various embodiments of the present disclosure.
Figure 7B:
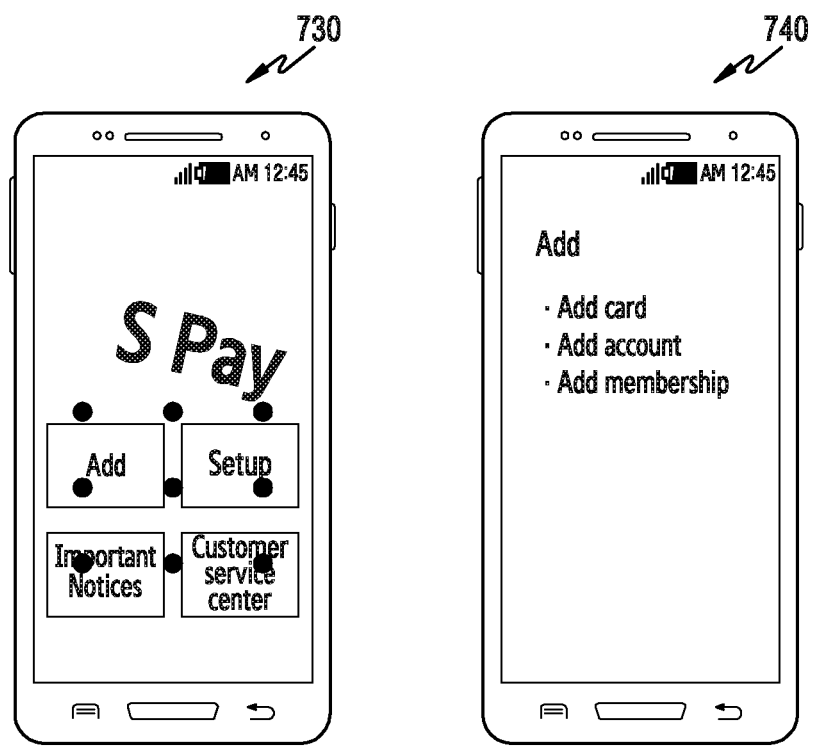

FIGS. 7A and 7B are diagrams for explaining an authentication operation according to various embodiments of the present disclosure. According to various embodiments, the procedure of performing the authentication operation may be a detailed operation for operation 413 described in FIG. 4.

Referring to FIG. 6, in operation 601, the electronic device 101 may determine whether a menu requiring authentication is selected. For example, the electronic device 101 may store information associated with a menu for invoking a screen (e.g., a payment screen, a personal information screen, etc.) to which only an authenticated user can have access. For example, the screen to which only the authenticated user can have access may include a user interface (or a GUI) for accessing personal information stored in the electronic device 101. Accordingly, the electronic device 101 may compare a menu selected by an input with the stored menu to determine whether the menu requiring authentication is selected.

Upon selecting a menu not requiring authentication, the electronic device 101 may output a screen corresponding to the selected menu. For example, if the menu not requiring authentication (e.g., an important notices menu) is selected from the second-mode launch screen output as shown in 710 of FIG. 7A, the electronic device 101 may output a screen corresponding to the selected menu without having to perform an additional authentication operation as shown in 720 of FIG. 7A.

Upon selecting the menu requiring authentication, in operation 603, the electronic device 101 may perform a user authentication operation. For example, as shown in 730 of FIG. 7B, the electronic device 101 may acquire authentication information by outputting a screen (e.g., an unlock screen) for receiving authentication information corresponding to a determined unlock mechanism (e.g., a pattern authentication mechanism, an iris authentication mechanism, a fingerprint authentication mechanism, a password authentication mechanism, etc.) in a state where the second-mode launch screen is output. In addition, the electronic device 101 may operate a sensor to acquire the authentication information.

In operation 605, the electronic device 101 may confirm an authentication result. For example, the electronic device 101 may confirm whether the received authentication information is identical to the stored authentication information.

If the user authentication fails, in operation 609, the electronic device 101 may handle the authentication failure. For example, the electronic device 101 may output a message for informing the authentication failure to a screen.

If the user authentication is successful, in operation 607, the electronic device 101 may output a screen corresponding to the selected menu. For example, as shown in 740 of FIG. 7B, the electronic device 101 may output a screen to which only the authenticated user can have access.

Figure 8:
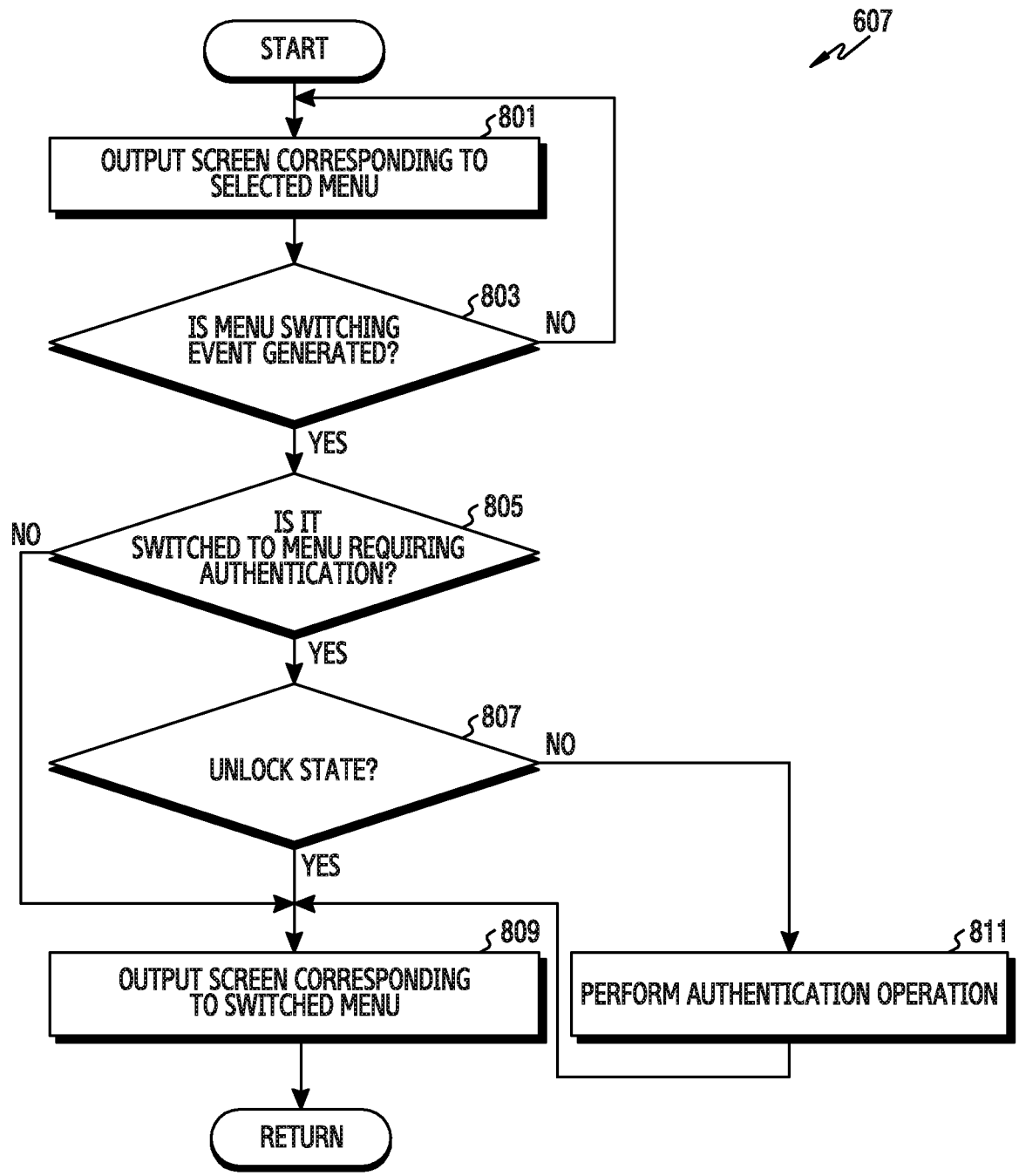
FIG. 8 is a flowchart illustrating a procedure of outputting a menu screen in the electronic device 101 according to various embodiments of the present disclosure.

FIG. 8 is a flowchart illustrating a procedure of outputting a menu screen in the electronic device 101 according to various embodiments of the present disclosure.

Figure 9A:
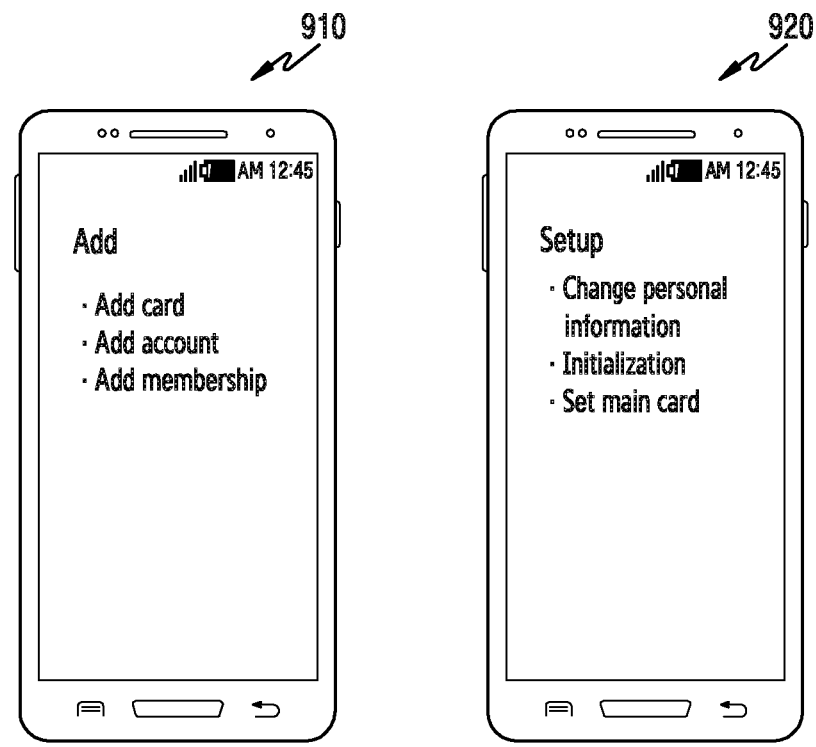
FIGS. 9A and 9B are diagrams for explaining an operation of outputting a menu screen according to various embodiments of the present disclosure.
Figure 9B:
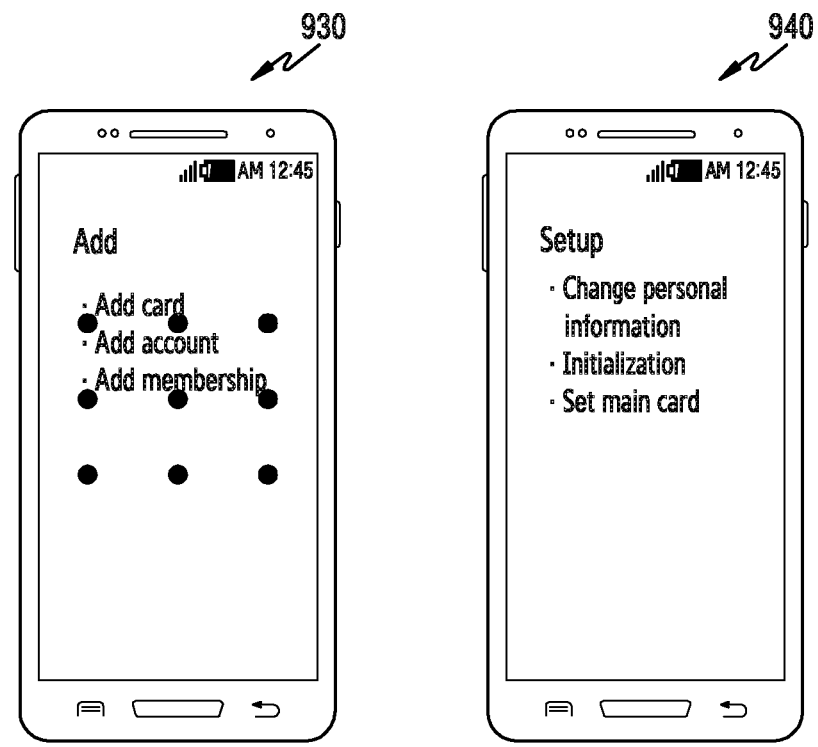

FIGS. 9A and 9B are diagrams for explaining an operation of outputting a menu screen according to various embodiments of the present disclosure. According to various embodiments, the procedure of outputting the menu screen may be a detailed operation for operation 607 described in FIG. 6.

Referring to FIG. 8, in operation 801, the electronic device 101 may output a screen corresponding to the selected menu. For example, the electronic device 101 may output a launch screen corresponding to a menu requiring authentication or a launch screen corresponding to a menu not requiring authentication.

In operation 803, the electronic device 101 may determine whether a menu switching event is generated. For example, the electronic device 101 may determine whether a menu for invoking a screen different from a currently output screen is selected.

If the menu switching event is not generated, the electronic device 101 may maintain an output of the launch screen.

If the menu switching event is generated, in operation 805, the electronic device 101 may determine whether the menu requiring authentication is selected. For example, the electronic device 101 may determine whether a menu for invoking a screen to which only an authenticated user can have access is selected.

Upon selecting a menu not requiring authentication, the electronic device 101 may output a screen corresponding to the selected menu without having to perform an additional authentication operation.

Upon selecting the menu requiring authentication, in operation 807, the electronic device 101 may determine whether it is in an unlock state. For example, the electronic device 101 may determine whether there is a history of successful user authentication through an authentication operation before a menu switching event is generated to determine the unlock state. For example, if the authentication is complete for another menu requiring authentication before the menu switching event is generated, the electronic device 101 may determine that there is the history of successful user authentication. In addition, if user authentication is complete in a state where the second-mode launch screen is output before the menu switching event is generated, the electronic device 101 may determine that there is the history of successful user authentication. In addition, after authentication is complete, the electronic device 101 may maintain a state in which user authentication is successful before a designated event (e.g., entering a sleep mode, deactivating a display). The electronic device 101 may determine that it is in an unlock state if there is the history of successful user authentication. In addition, if the user authentication fails or the user authentication operation is not performed, the electronic device 101 may determine that it is in a lock state.

If it is determined as the unlock state, in operation 809, the electronic device 101 may output a screen corresponding to the selected menu without having to perform an additional authentication operation. For example, if it is determined as the unlock state, the electronic device 101 may not perform an additional authentication operation in a screen output as shown in 910 of FIG. 9A, and may switch to a screen requiring authentication as shown in 920 of FIG. 9A.

If it is determined as the lock state, as shown in operation 811, the electronic device 101 may perform an authentication operation. For example, the electronic device 101 may output a screen (e.g., an unlock screen) for receiving authentication information as shown at 930 of FIG. 9B, or may operate a sensor for acquiring the authentication information. In addition, the electronic device 101 may perform a user authentication operation based on the acquired authentication information. If the user authentication is successful, in operation 809, the electronic device 101 may output a screen corresponding to the selected menu. For example, if the authentication is successful, as shown in 940 of FIG. 9B, the electronic device 101 may switch to the screen requiring authentication.

Figure 10:
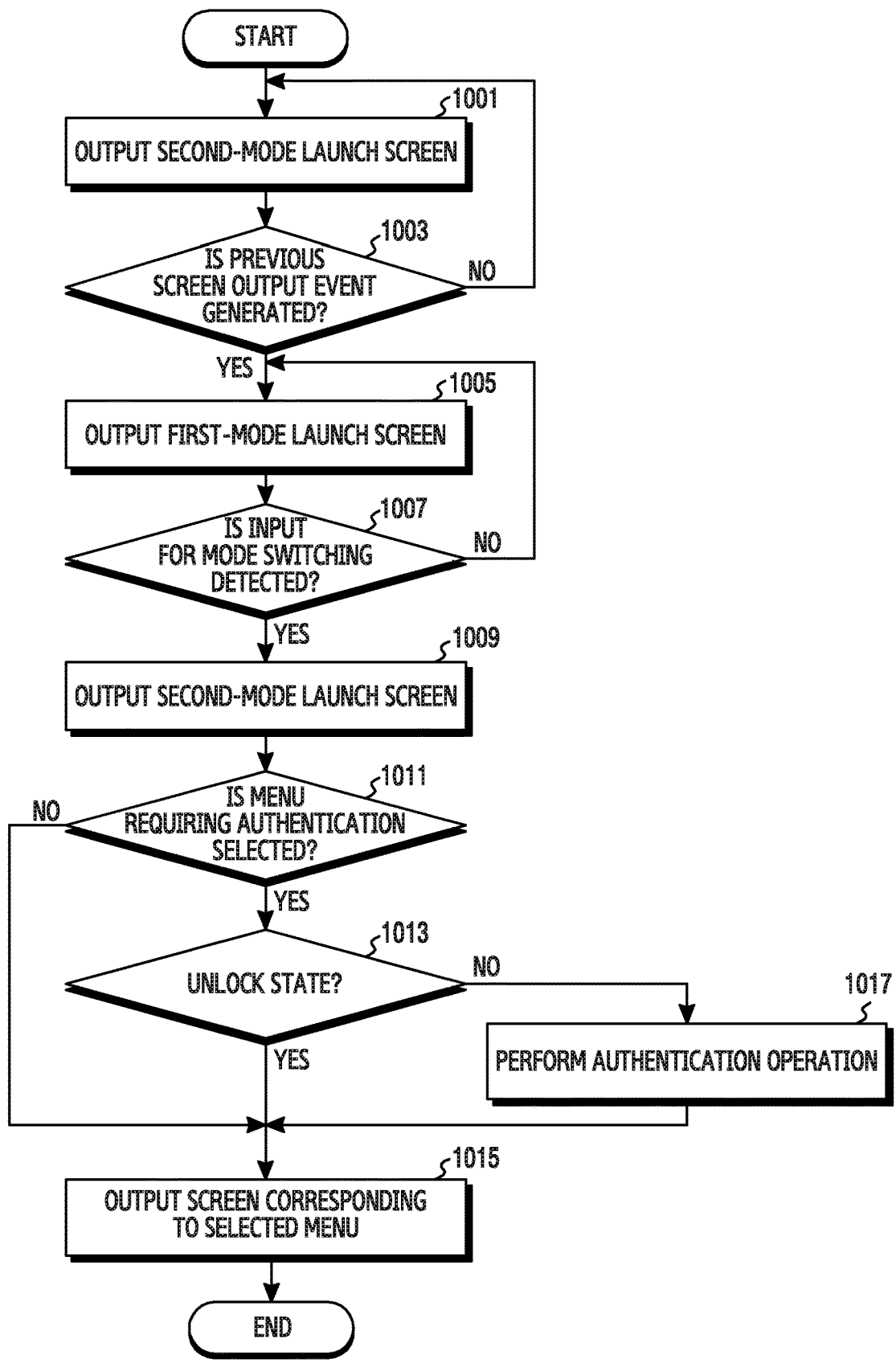
FIG. 10 is a flowchart illustrating an operation of controlling an application launch mode in the electronic device 101 according to various embodiments of the present disclosure.

FIG. 10 is a flowchart illustrating an operation of controlling an application launch mode in the electronic device 101 according to various embodiments of the present disclosure.

Figure 11:
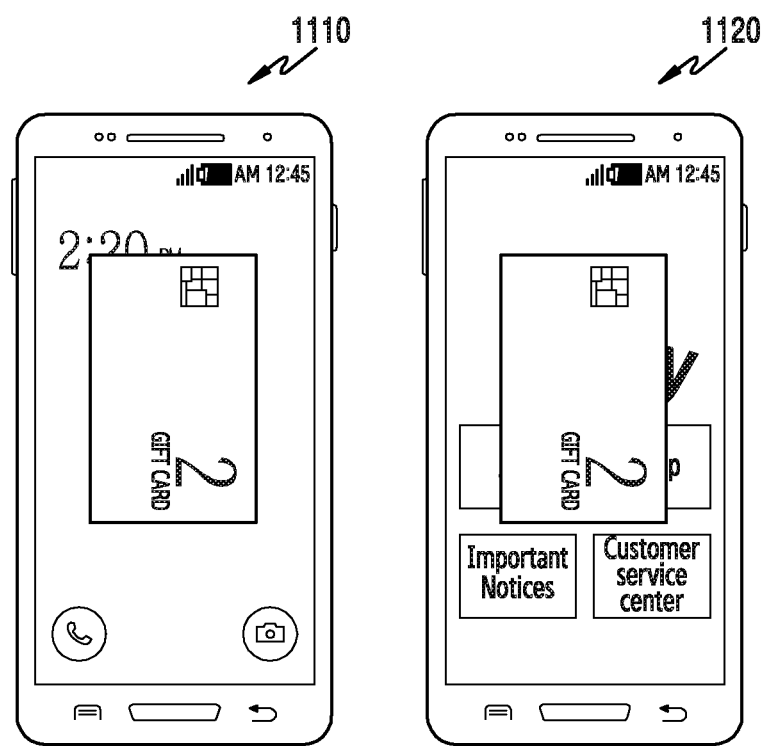
FIG. 11 is a diagram for explaining an operation of controlling a launch mode according to various embodiments of the present disclosure.

FIG. 11 is a diagram for explaining an operation of controlling a launch mode according to various embodiments of the present disclosure.

Referring to FIG. 10, in operation 1001, the electronic device 101 may output a second-mode launch screen. For example, upon detecting an input for mode switching in a state where a first-mode launch screen is output, the electronic device 101 may switch to the second-mode launch screen and output it.

In operation 1003, the electronic device 101 may determine whether a previous screen output event is generated. For example, a previous screen may be the first-mode launch screen output before the second-mode launch screen is output. For example, the previous screen output event may include at least one of a key input, a touch input, a gesture input, and a voice command input.

If the previous screen output event is not generated, the electronic device 101 may maintain an output of the second-mode launch screen.

If the previous screen output event is generated, in operation 1005, the electronic device 101 may output the first-mode launch screen Output before the second-mode launch screen is output, for example, when a previously output launch screen is the first-mode launch screen. For example, as shown in 1110 of FIG. 11, the electronic device 101 may output the first-mode launch screen after switching the second-mode launch screen to a screen for which the lock function is set. For another example, as shown in 1120 of FIG. 11, the electronic device 101 may output the first-mode launch screen in a state where the second-mode launch screen is output.

In operation 1007, the electronic device 101 may determine whether an input for mode switching is detected. For example, the mode switching may include switching from the first-mode launch screen to the second-mode launch screen. For example, the electronic device 101 may determine an input for selecting the output first-mode launch screen or an area (e.g., an App home menu) designated in the first-mode launch screen as the input for mode switching.

Upon detecting no input for mode switching, the electronic device 101 may control the operation of the electronic device 101 based on the first-mode launch screen. For example, the electronic device 101 may maintain the output of the first-mode launch screen. For another example, if the first-mode launch screen is output for a payment application, the electronic device 101 may perform a payment operation in a state where the first-mode launch screen is output.

Upon detecting the input for mode switching, in operation 1009, the electronic device 101 may output the second-mode launch screen. For example, the electronic device 101 may switch the first-mode launch screen to the second-mode launch screen in the state where the lock function is set. For another example, the electronic device 101 may stop displaying of the first-mode launch screen output on the second-mode launch screen.

In operation 1011, the electronic device 101 may determine whether a menu requiring authentication is selected. For example, the electronic device 101 may determine whether at least one menu for invoking a screen (e.g., a payment screen, a personal information screen, etc.) to which only an authenticated user can have access, a screen including personal information, or the like is selected.

Upon selecting a menu not requiting authentication, in operation 1015, the electronic device 101 may output a screen corresponding to the selected menu.

Upon selecting the menu requiring authentication, in operation 1013, the electronic device 101 may determine whether it is in an unlock state. For example, the electronic device 101 may determine whether there is a history of successful user authentication through an authentication operation before a menu switching event is generated to determine the unlock state. For example, if user authentication is complete through the second-mode launch screen output before the previous screen output event is generated, the electronic device 101 may determine that there is the history of successful user authentication. In addition, after authentication is complete, the electronic device 101 may determine that there is the history of successful user authentication before a designated event (e.g., entering a sleep mode, deactivating a display). The electronic device 101 may determine that it is in an unlock state if there is the history of successful user authentication. In addition, if the user authentication fails, or if a designated event is generated after user authentication is complete, or if the user authentication operation is not performed, the electronic device 101 may determine that it is in a lock state.

If it is determined as the unlock state, in operation 1015, the electronic device 101 may output a screen corresponding to the selected menu. For example, the electronic device 101 may not perform an additional authentication operation even if a menu requiring authentication is selected in the unlock state.

If it is determined as the lock state, in operation 1017, the electronic device 101 may perform a user authentication operation. For example, the electronic device 101 may perform an authentication operation by outputting a screen (e.g., an unlock screen) for receiving authentication information to a screen to which the second-mode launch screen is output. In addition, if the authentication is successful, in operation 1015, the electronic device 101 may output a screen corresponding to the selected menu.

Figure 12:
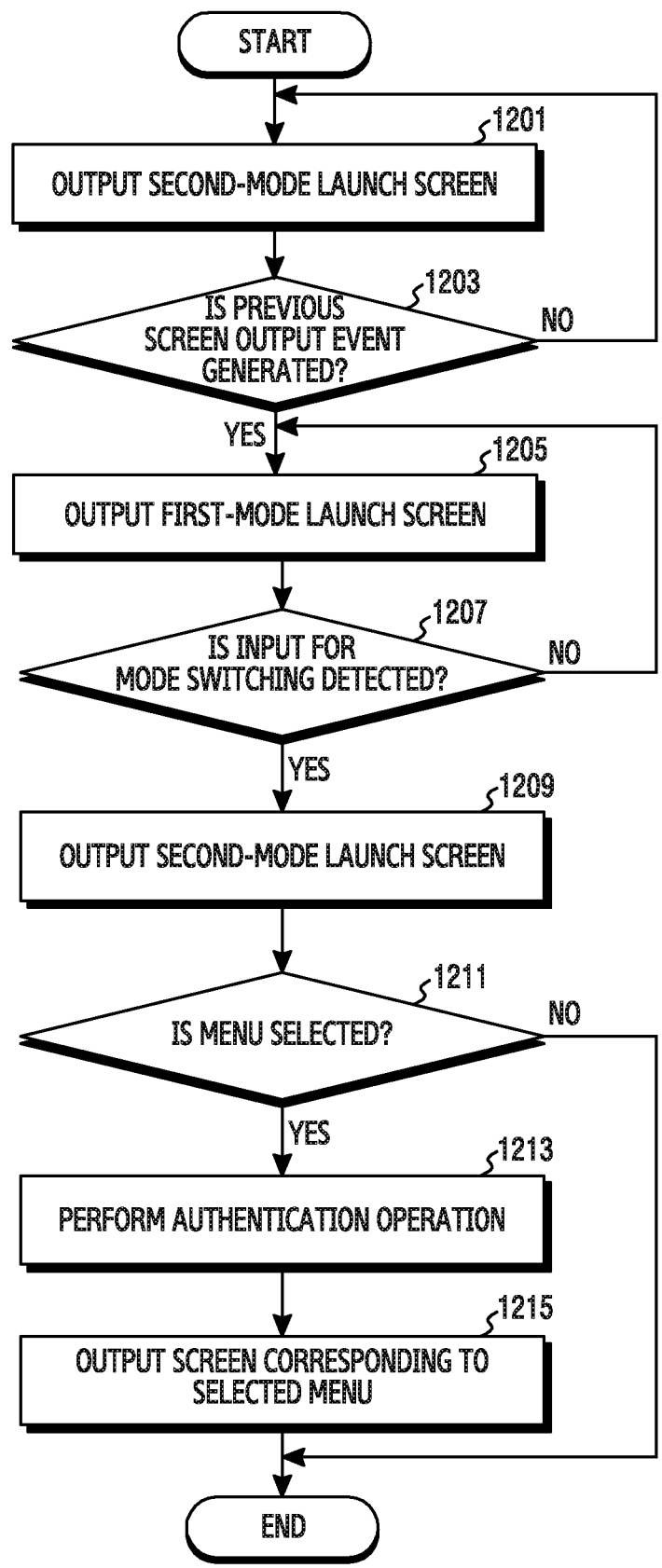
FIG. 12 is a flowchart illustrating another operation of controlling an application launch mode in the electronic device 101 according to various embodiments of the present disclosure.

FIG. 12 is a flowchart illustrating another operation of controlling an application launch mode in the electronic device 101 according to various embodiments of the present disclosure.

Referring to FIG. 12, in operation 1201, the electronic device 101 may output a second-mode launch screen. For example, upon detecting an input for mode switching in a state where a first-mode launch screen is output, the electronic device 101 may switch to the second-mode launch screen and output it.

In operation 1203, the electronic device 101 may determine whether a previous screen output event is generated. For example, a previous screen may be the first-mode launch screen output before the second-mode launch screen is output. For example, the previous screen output event may include at least one of a key input, a touch input, a gesture input, and a voice command input.

If the previous screen output event is not generated, the electronic device 101 may maintain an output of the second-mode launch screen.

If the previous screen output event is generated, in operation 1205, the electronic device 101 may output a launch screen output before the second-mode launch screen is output. For example, if a previously output launch screen is the first-mode launch screen, the electronic device 101 may output the first-mode launch screen in accordance with the previous screen output event.

In operation 1207, the electronic device 101 may determine whether an input for mode switching is detected. For example, the mode switching may include switching from the first-mode launch screen to the second-mode launch screen. For example, the electronic device 101 may determine an input for selecting the output first-mode launch screen or an area (e.g., an App home menu) designated in the first-mode launch screen as the input for mode switching.

Upon detecting no input for mode switching, the electronic device 101 may control the operation of the electronic device 101 based on the first-mode launch screen. For example, the electronic device 101 may maintain the output of the first-mode launch screen. For another example, if the first-mode launch screen is output for a payment application, the electronic device 101 may perform a payment operation in a state where the first-mode launch screen is output.

Upon detecting the input for mode switching, in operation 1209, the electronic device 101 may output the second-mode launch screen. For example, the electronic device 101 may switch the first-mode launch screen to the second-mode launch screen in the state where the lock function is set. For another example, the electronic device 101 may stop displaying of the first-mode launch screen output on the second-mode launch screen.

In operation 1211, the electronic device 101 may determine whether a menu included in the second-mode launch screen is selected. For example, the electronic device 101 may determine whether at least one menu is selected for invoking a screen (e.g., a payment screen, a personal information screen, etc.) to which only an authenticated user can have access, a screen including personal information, or the like or whether at least one menu is selected for invoking a screen (e.g., an event menu screen, an important notices menu, a customer service center menu, etc.).

Upon selecting no menu from the second-mode launch screen, the electronic device 101 may maintain a state where the second-mode launch screen is output. In addition, the electronic device 101 may perform an operation of determining whether a menu selection is detected in the state where the second-mode launch screen is output.

Upon selecting the menu from the second-mode launch screen, in operation 1213, the electronic device 101 may perform a user authentication operation. For example, even if the user authentication has already been complete through the authentication operation, the electronic device 101 may increase security for the menu requiring authentication by performing the authentication operation again. In addition, if the authentication is successful, the electronic device 101 may output a screen corresponding to the selected menu in operation 1215.

Figure 13:
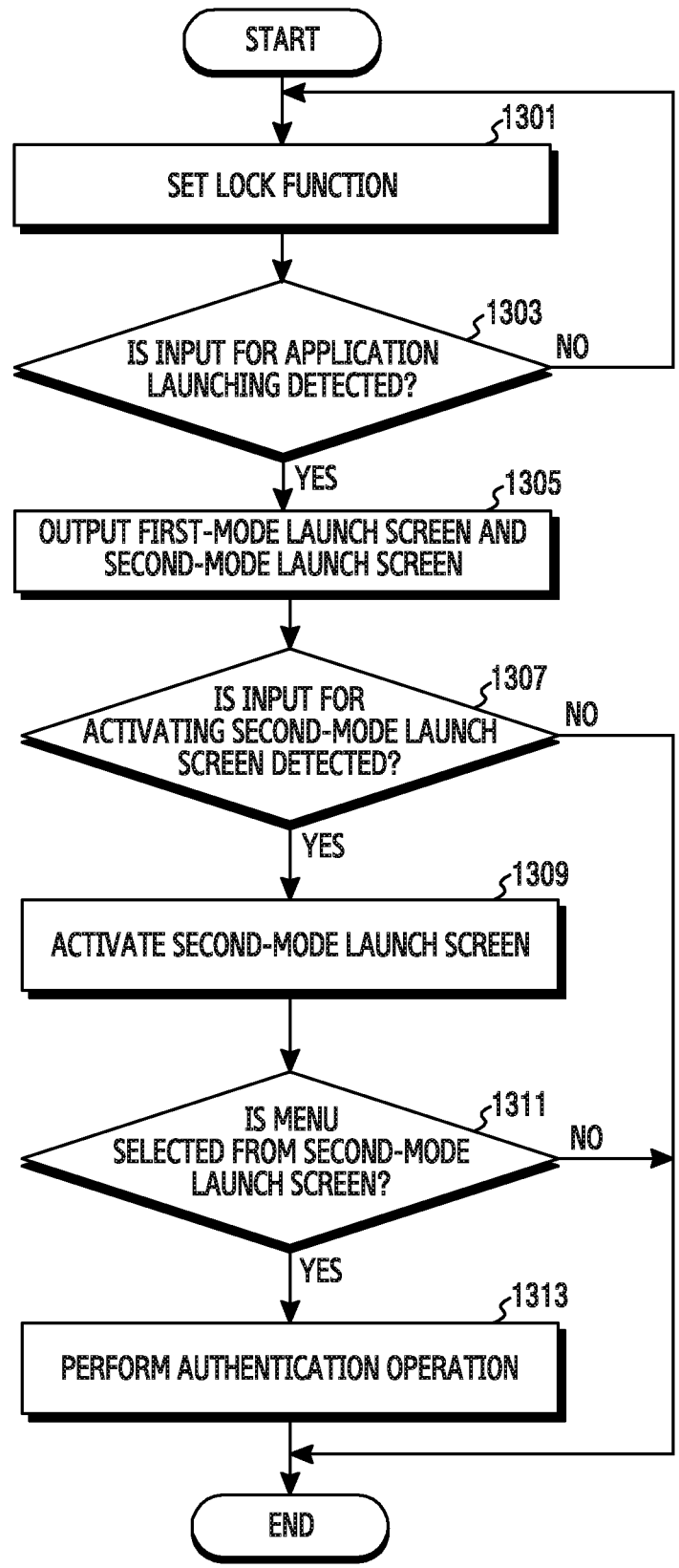
FIG. 13 is a flowchart illustrating another operation of launching an application in a state where a lock function is set in the electronic device 101 according to various embodiments of the present disclosure.

FIG. 13 is a flowchart illustrating another operation of launching an application in a state where a lock function is set in the electronic device 101 according to various embodiments of the present disclosure.

Figure 14:
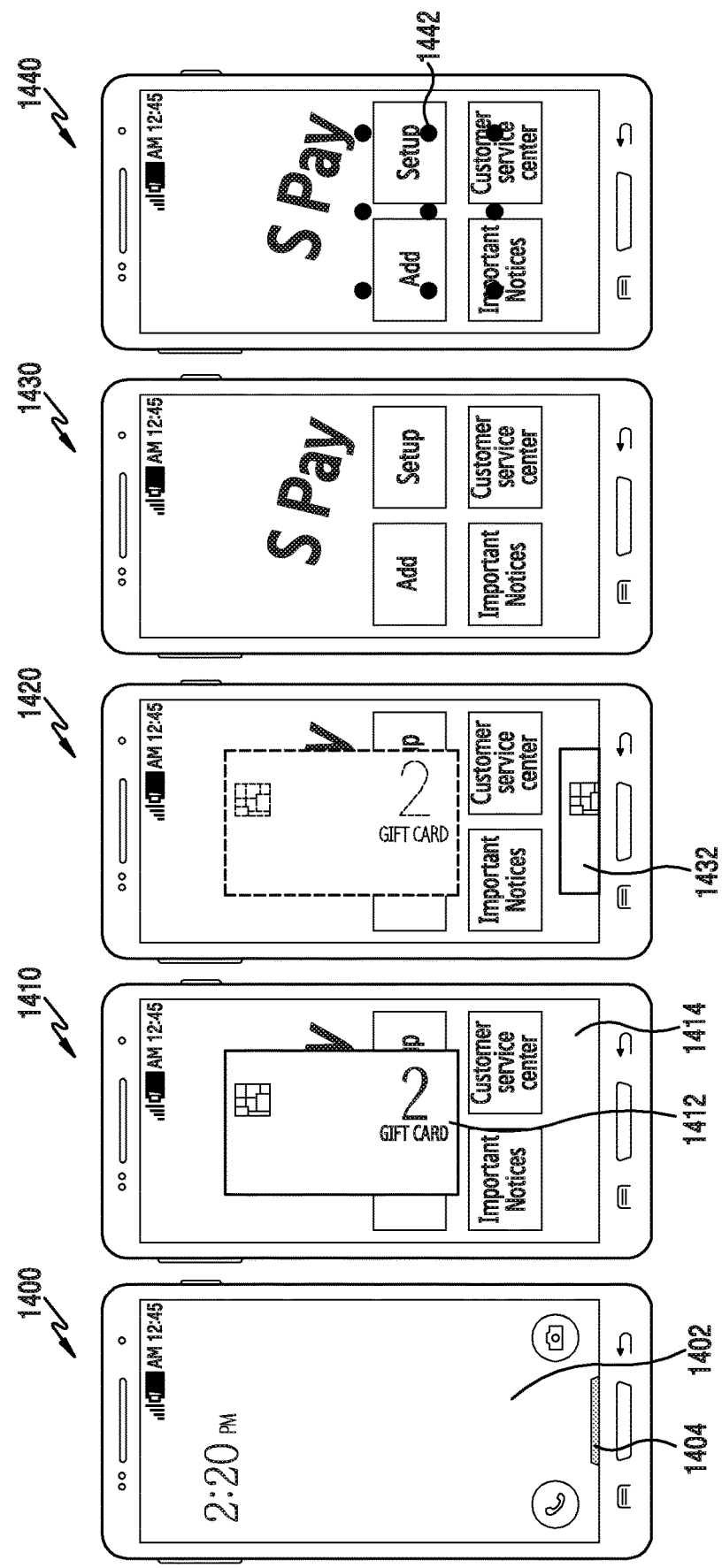
FIG. 14 is a diagram for explaining an operation of launching an application according to various embodiments of the present disclosure.

FIG. 14 is a diagram for explaining an operation of launching an application according to various embodiments of the present disclosure.

Referring to FIG. 13, in operation 1301, the electronic device 101 may set the lock function. For example, the electronic device 101 may set the lock function having a specific level of security. For example, the lock function having the specific level of security may be a lock function which requires user authentication information (e.g., fingerprint information, pattern information, password information, iris information, etc.) to release the lock function.

In operation 1303, the electronic device 101 may determine whether an input for application launching is detected. For example, as shown in 1400 of FIG. 14, the electronic device 101 may determine whether a user input is detected which sweeps in a direction of a display from a bottom area of a screen (e.g., a lock screen) 1402 for which the lock function is set. In addition, the electronic device 101 may display an indicator 1404 to indicate that the application can be launched on the screen 1402 for which the lock function is set, and may determine whether a user input for the indicator is detected.

Upon detecting no input for application launching, the electronic device 101 may determine whether to launch the application in the state where the lock function is set. For example, the electronic device 101 may perform an operation associated with operation 1301. For another example, the electronic device 101 may perform an operation associated with operation 1303.

Upon detecting the input for application launching, in operation 1305, the electronic device 101 may output a first-mode launch screen and second-mode launch screen for the application in the state where the lock function is set. The first-mode launch screen may be a launch screen (e.g., a quick-launch screen) capable of providing some functions of the application. In addition, the second-mode launch screen may be a launch screen capable of providing relatively a greater number of functions than the first-mode launch screen. For example, as shown in 1410 of FIG. 14, the electronic device 101 may output an activated first-mode launch screen 1412 on a deactivated second-mode launch screen 1414.

In operation 1307, the electronic device 101 may determine whether an input for activating the second-mode launch screen is detected. For example, as shown in 1420 of FIG. 14, the electronic device 101 may determine whether an input for moving (see 1432) the activated first mode-launch screen in a designated direction (e.g., a lower portion of a display) is detected.

Upon detecting no input for activating the second-mode launch screen, the electronic device 101 may maintain an output of the first-mode launch screen and the second-mode launch screen. For example, the electronic device 101 may maintain a state where the first-mode launch screen is activated and the second-mode launch screen is deactivated.

Upon detecting the input for activating the second-mode launch screen, in operation 1309, the electronic device 101 may activate the second-mode launch screen. For example, the electronic device 101 may switch the first-mode launch screen in an activation state to a deactivation state, and may switch the second-mode launch screen in the deactivation state to the activation state. For example, the electronic device 101 may stop outputting of the first-mode launch screen switched to the deactivation state to the screen.

In operation 1311, the electronic device 101 may determine whether an input for selecting a menu from the second-mode launch screen is detected. For example, the electronic device 101 may determine whether an input for selecting at least one menu is detected from a menu (e.g., an add menu, a setup menu, an important notices menu, and a customer service center menu) included in the second-mode launch screen output as shown in 1430 of FIG. 14.

Upon detecting no input for selecting the menu, the electronic device 101 may maintain the output of the second-mode launch screen.

Upon detecting the input for selecting the menu, in operation 1313, the electronic device 101 may perform the authentication operation. For example, the electronic device 101 may perform an authentication operation of releasing the lock before outputting a screen corresponding to the selected menu. For example, as shown in 1440 of FIG. 14, the electronic device 101 may output a screen (e.g., an unlock screen) 1442 for receiving authentication information corresponding to a determined unlock mechanism, or may operate a sensor for acquiring the authentication information.

Figure 15:
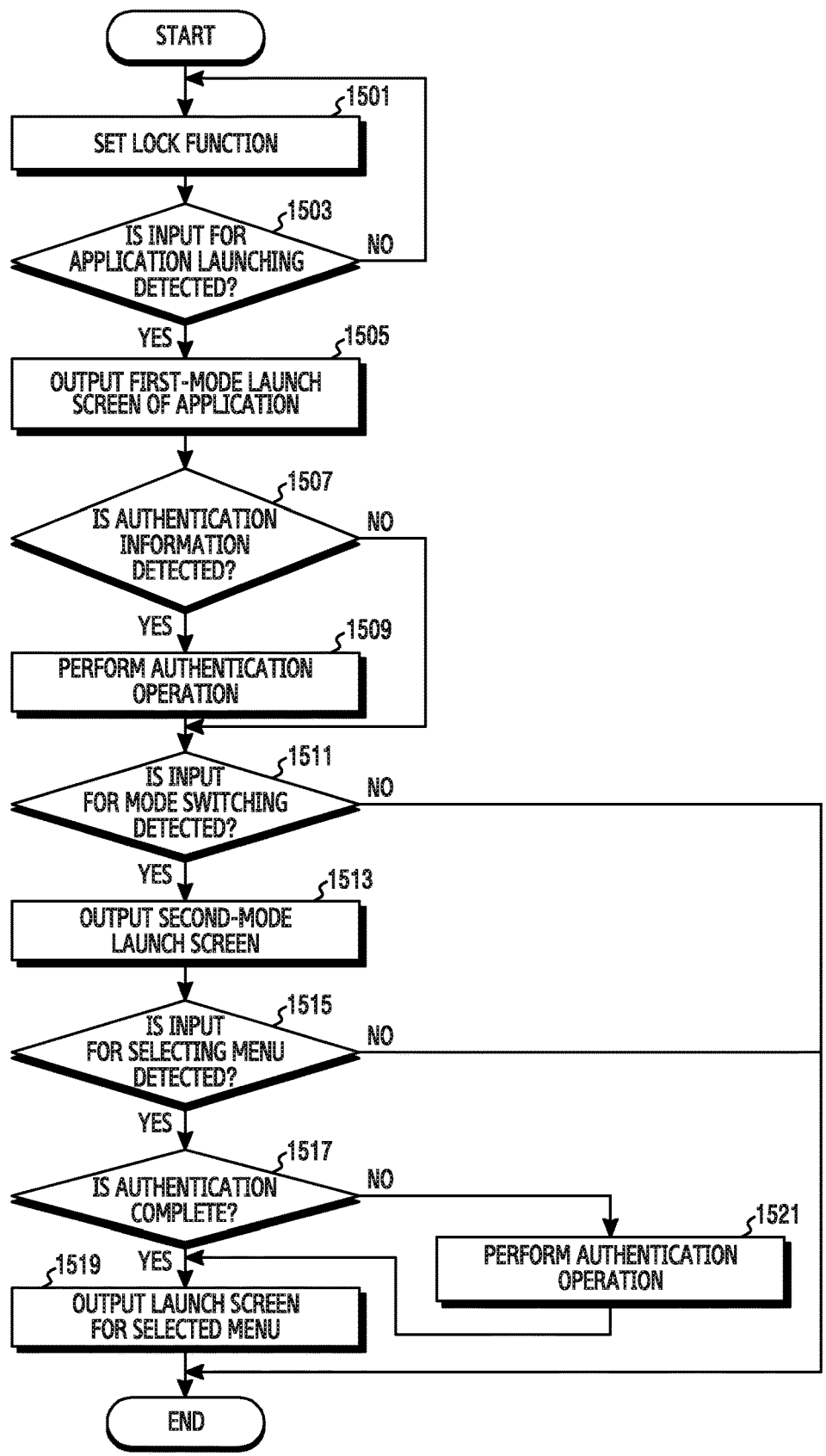
FIG. 15 is a flowchart illustrating another operation of launching an application in a state where a lock function is set in the electronic device 101 according to various embodiments of the present disclosure.

FIG. 15 is a flowchart illustrating another operation of launching an application in a state where a lock function is set in the electronic device 101 according to various embodiments of the present disclosure.

Figure 16:
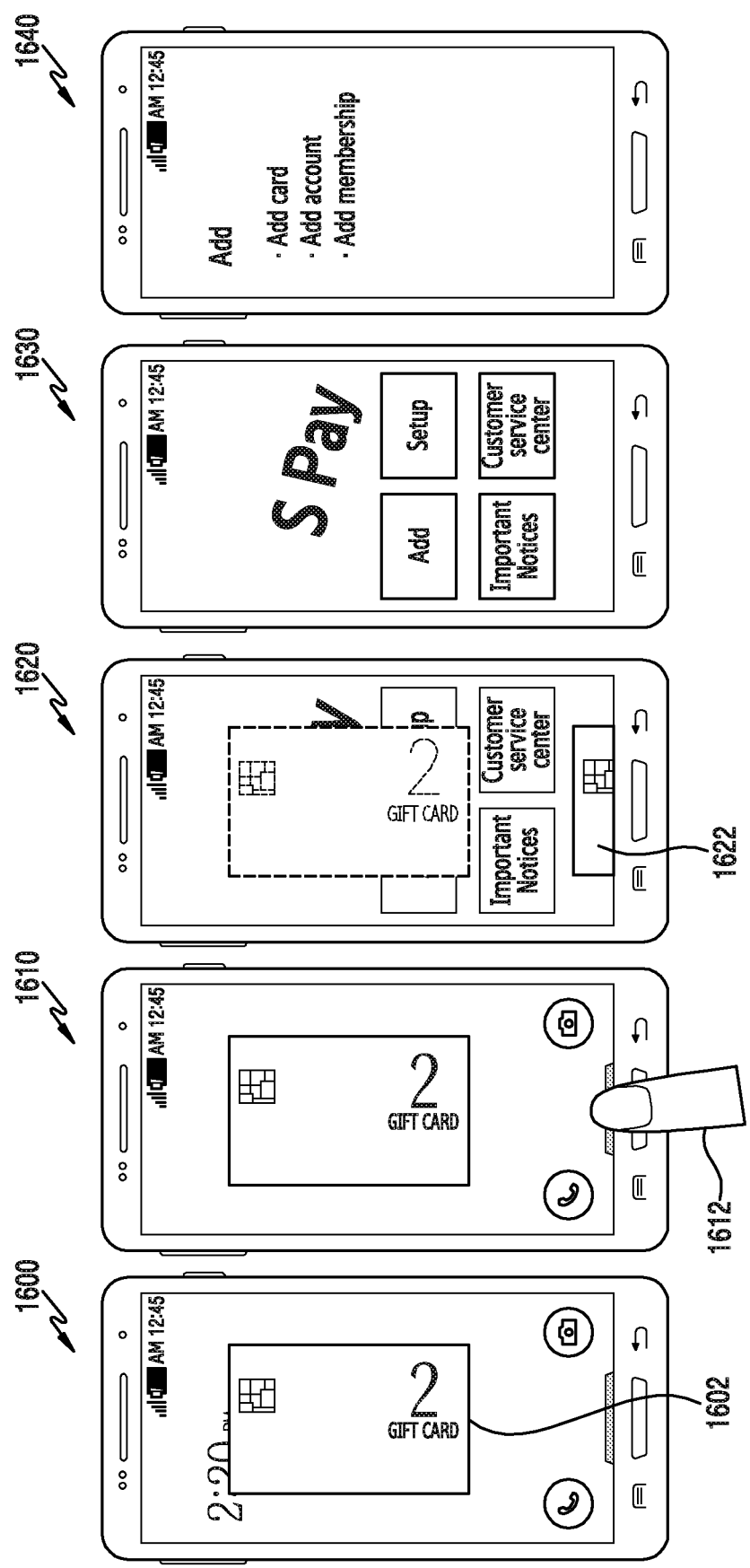
FIG. 16 is a diagram for explaining an operation of launching an application according to various embodiments of the present disclosure.

FIG. 16 is a diagram for explaining an operation of launching an application according to various embodiments of the present disclosure.

Referring to FIG. 15, in operation 1501, the electronic device 101 may set the lock function. For example, the electronic device 101 may set the lock function having a specific level of security. For example, the lock function having the specific level of security may be a lock function which requires user authentication information (e.g., fingerprint information, pattern information, password information, iris information, etc.) to release the lock function.

In operation 1503, the electronic device 101 may determine whether an input for application launching is detected. For example, the electronic device 101 may determine whether a user input is detected which sweeps in a direction of a display from a bottom area of a screen (e.g., a lock screen) for which the lock function is set.

Upon detecting no input for application launching, the electronic device 101 may determine whether to launch the application in the state where the lock function is set. For example, the electronic device 101 may perform an operation associated with operation 1501. For another example, the electronic device 101 may perform an operation associated with operation 1503.

Upon detecting the input for application launching, in operation 1505, the electronic device 101 may output a first-mode launch screen for the application in the state where the lock function is set. The first-mode launch screen may be a launch screen (e.g., a quick-launch screen) capable of providing some functions of the application. For example, as shown in 1600 of FIG. 16, the electronic device 101 may output a first-mode launch screen 1602 in the state where the lock function is set.

In operation 1507, the electronic device 101 may determine whether authentication information is detected in the state where the first-mode launch screen is output. For example, the electronic device 101 may determine whether user authentication information (e.g., fingerprint information, pattern information, password information, iris information, etc.) for releasing the lock function is detected. For another example, the electronic device 101 may determine whether the user authentication information for executing at least one function (e.g., a payment function, etc.) of the electronic device 101 is detected. In this case, the electronic device 101 may use authentication information detected in the state where the first-mode launch screen is output as information for executing at least one function. For example, the user authentication information for releasing the lock function and the user authentication information for executing at least one function (e.g., a payment function, etc.) of the electronic device 101 may be the same information or different information. As shown in 1610 of FIG. 16, the electronic device 101 may acquire sensing information for an object (e.g., a finger) (1612) which is in contact with a sensor capable of acquiring bio information (e.g., fingerprint information) as authentication information.

Upon detecting the authentication information, in operation 1509, the electronic device 101 may perform an authentication operation. For example, the electronic device 101 may determine whether the detected input information and the stored authentication information are identical. In addition, the electronic device 101 may perform the authentication operation for a pre-set lock function by using the detected authentication information. In addition, the electronic device 101 may perform the authentication operation not only for the pre-set lock function but also for a designated function of the electronic device 101 by using the detected authentication information.

In operation 1511, the electronic device 101 may determine whether an input for mode switching is detected. The mode switching may include switching from the first-mode launch screen to the second-mode launch screen for the application. For example, the second-mode launch screen may be a launch screen (e.g., an application home screen (e.g., main screen)) capable of providing relatively a greater number of functions (e.g., all functions) than the first-mode launch screen. For example, the electronic device 101 may determine an input for selecting the output first-mode launch screen or an area (e.g., an App home menu (or icon)) designated in the first-mode launch screen as the input for mode switching.

For another example, as shown in 1620 of FIG. 16, the electronic device 101 may determine an input for moving (see 1622) the first mode-launch screen in a designated direction (e.g., a lower portion of a display) as the input for mode switching. Upon detecting no authentication information, the electronic device 101 may determine whether an input for mode switching is detected.

Upon detecting no input for mode switching, the electronic device 101 may control the operation of the electronic device 101 based on the first-mode launch screen. For example, if the first-mode launch screen is output for a payment application, the electronic device 101 may perform a payment operation in a state where the first-mode launch screen is output. For example, the electronic device 101 may output payment information to a payment terminal based on a designated method (e.g., an MST method, etc.).

Upon detecting the input for mode switching, in operation 1513, the electronic device 101 may switch the first-mode launch screen to the second-mode launch screen. For example, as shown in 1630 of FIG. 16, the electronic device 101 may switch the output first-mode launch screen to the second-mode launch screen for the application.

In operation 1515, the electronic device 101 may determine whether an input for selecting a menu from the second-mode launch screen is detected. For example, the electronic device 101 may determine whether an input for selecting at least one menu is detected from a menu (e.g., an add menu, a setup menu, an important notices menu, and a customer service center menu) included in the second-mode launch screen.

Upon detecting no input for selecting the menu, the electronic device 101 may maintain the output of the second-mode launch screen.

Upon detecting an input for selecting a menu, in operation 1517, the electronic device 101 may determine whether authentication is complete. For example, the electronic device 101 may determine whether user authentication is successful by using an authentication operation performed in a state where the first-mode launch screen is output.

Upon determining that authentication is complete, in operation 1519, the electronic device 101 may output a launch screen for the selected menu. For example, as shown in 1640 of FIG. 16, even if an authentication-required menu included in the second-mode launch screen is selected in a state where authentication is complete, the electronic device 101 may output a launch screen corresponding to the selected menu without having to perform an additional authentication operation.

If it is determined that authentication is not complete, in operation 1521, the electronic device 101 may perform a user authentication operation. For example, the electronic device 101 may perform an authentication operation by outputting a screen (e.g., an unlock screen) for receiving authentication information to a screen to which the second-mode launch screen is output. In addition, if the authentication is successful, in operation 1015, the electronic device 101 may output a screen corresponding to the selected menu.

According to various embodiments, a method of operating an electronic device (e.g., the electronic device 101) may include displaying a first-mode launch screen for an application based on an application launching request in a state where a lock function is set, switching the displayed first-mode launch screen to a second-mode launch screen of the application based on a mode switching request, and determining whether to proceed with an authentication operation based on an operation selected from the second-mode launch screen.

According to one embodiment, the selected operation may include an operation of invoking a user interface (or a GU) for accessing personal information.

According to one embodiment, the determining of whether to proceed with an authentication operation based on an operation selected from the second-mode launch screen may include skipping the authentication operation for an operation selected in the second mode in response to completion of authentication before switching to the second-mode launch screen.

According to one embodiment, the first-mode launch screen may include a screen for controlling designated some functions of the application.

According to one embodiment, the second-mode launch screen may include a main screen of the application.

According to one embodiment, the method of operating the electronic device may further include outputting a screen corresponding to a menu requiring authentication if the authentication is successful through the authentication operation.

According to one embodiment, the method of operating the electronic device may further include releasing the lock function if the authentication is successful through the authentication operation.

According to various embodiments of the present disclosure, an electronic device and an operating method thereof can allow a user to be able to quickly access a function provided in an application by switching a quick-launch screen to an application home screen in a state where a lock function is not released.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display; and
at least one processor configured to:
display a first-mode launch screen specific to a payment application on the display based on an application launching request input while being in a state where a lock function is set,
perform a payment operation based on the first-mode launch screen while in a state where the lock function is set,
switch from displaying the first-mode launch screen specific to the payment application on the display to displaying a second-mode launch screen comprising menus for executing each of functions performed by the payment application on the display, based on a mode launch screen switching request input while maintaining the state where the lock function is set, and
determine whether to proceed with an authentication operation based on whether a function corresponding to a menu selected from the menus of the payment application provided on the second-mode launch screen requires to release the lock function,
wherein the function corresponding to the selected menu is not provided on the first-mode launch screen.

2. The electronic device of claim 1, wherein the selected function comprises a function for invoking a user interface for accessing personal information.

3. The electronic device of claim 1, wherein the processor is further configured to skip the authentication operation for the selected function in the second-mode launch screen in response to completion of authentication before switching to the second-mode launch screen.

4. The electronic device of claim 1, wherein the first-mode launch screen comprises a screen for controlling designated functions of the payment application.

5. The electronic device of claim 1, wherein the second-mode launch screen comprises a main screen of the payment application.

6. The electronic device of claim 1, wherein the processor is further configured to output a screen corresponding to the selected menu requiring authentication if the authentication is successful through the authentication operation.

7. The electronic device of claim 1, wherein the processor is further configured to release the lock function if the authentication is successful through the authentication operation.

8. A method of operating an electronic device, the method comprising:
displaying a first-mode launch screen specific to a payment application based on an application launching request input while being in a state where a lock function is set;
performing a payment operation based on the first-mode launch screen while in a state where the lock function is set;
switching from displaying the first-mode launch screen specific to the payment application to displaying a second-mode launch screen comprising menus for executing each of functions performed by the payment application based on a mode launch screen switching request input while maintaining the state where the lock function is set; and
determining whether to proceed with an authentication operation based on whether a function corresponding to a menu selected from the menus of the payment application provided on the second-mode launch screen requires to release the lock function,
wherein the function corresponding to the selected menu is not provided on the first-mode launch screen.

9. The method of claim 8, wherein the selected function comprises a function for invoking a user interface for accessing personal information.

10. The method of claim 8, wherein the determining of whether to proceed with the authentication operation based on the selected function from the second-mode launch screen comprises skipping the authentication operation for the operation selected from the second-mode launch screen in response to completion of authentication before switching to the second-mode launch screen.

11. The method of claim 8, wherein the first-mode launch screen comprises a screen for controlling designated functions of the payment application.

12. The method of claim 8, wherein the second-mode launch screen comprises a main screen of the payment application.

13. The method of claim 8, further comprising outputting a screen corresponding to a menu requiring authentication if the authentication is successful through the authentication operation.

14. The method of claim 8, further comprising releasing the lock function if the authentication is successful through the authentication operation.

15. An electronic device comprising:
a display; and
at least one processor configured to:
display, while being in a state where a lock function is set, a first-mode launch screen of an activation state specific to a payment application and a second-mode launch screen of a deactivation state specific to the payment application on the display based on an application launching request input,
perform a payment application based on the first-mode launch screen while in a state where the lock function is set,
stop the displaying of the first-mode launch screen specific to the payment application displayed on the display based on a request input for activating the second-mode launch screen comprising menus for executing each of functions performed by the payment application,
switch the second-mode launch screen specific to the payment application to the activation state while maintaining the state where the lock function is set, and
determine whether to proceed with an authentication operation based on whether a function corresponding to a menu selected from the menus provided on the second-mode launch screen specific to the payment application switched to the activation state requires to release the lock function,
wherein the function corresponding to the selected menu is not provided on the first-mode launch screen.

16. The electronic device of claim 15, wherein the selected function comprises a function for invoking a user interface for accessing personal information.

17. The electronic device of claim 15, wherein the first-mode launch screen comprises a screen for controlling designated functions of the payment application.

18. The electronic device of claim 15, wherein the second-mode launch screen comprises a main screen of the payment application.

19. The electronic device of claim 15, wherein the processor is further configured to output a screen corresponding to a menu requiring authentication if the authentication is successful through the authentication operation.

20. The electronic device of claim 15, wherein the processor is further configured to release the lock function if the authentication is successful through the authentication operation.

* * * * *